US012784776B2

(12) United States Patent
Miller et al.

(10) Patent No.: US 12,784,776 B2
(45) **Date of Patent: *Nov. 3, 2026**

(54) PERSONALIZED ADAPTIVE MEETING PLAYBACK

(71) Applicant: MICROSOFT TECHNOLOGY LICENSING, LLC, Redmond, WA (US)

(72) Inventors: Adi L. Miller, Ramat Hasharon (IL); Haim Somech, Ramat Gan (IL); Oded Nahir, Hogla (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/965,797

(22) Filed: Dec. 2, 2024

(65) Prior Publication Data

US 2025/0095686 A1 Mar. 20, 2025

Related U.S. Application Data

(63) Continuation of application No. 17/931,176, filed on Sep. 12, 2022, now Pat. No. 12,198,725.

(51) Int. Cl.
*G11B 27/00* (2006.01)

(52) U.S. Cl.
CPC .................................. *G11B 27/005* (2013.01)

(58) Field of Classification Search
CPC .................................................... G11B 27/005
See application file for complete search history.

(56) References Cited

U.S. PATENT DOCUMENTS 12,198,725 B2 * 1/2025 Miller .................... G11B 27/28

OTHER PUBLICATIONS

International Preliminary Report on Patentability for PCT Application No. PCT/US2023/030744, Mar. 27, 2025, 14 pages.

* cited by examiner

*Primary Examiner* — Girumsew Wendmagegn

(57) ABSTRACT

Technology is disclosed for programmatically determining, for a segment of a meeting recording, a user-specific adaptive playback speed, and generating a time-stretched segment playable at the adaptive playback speed. The adaptive playback speed is faster or slower than a default playback speed of the meeting recording. To determine the adaptive playback speed, this disclosure provides technologies to determine a playback data feature based on user-meeting data. The adaptive playback is generated based on the playback data feature. The segment is time-stretched to the adaptive playback speed to generate an updated meeting recording including the segment that is time-stretched and playable at the adaptive playback speed. In this manner, an updated meeting recording, specific to a user, and playable at an adaptive playback speed based on user-meeting data may reduce bandwidth associated with user's manually editing videos or rewinding playback, while improving user experience.

20 Claims, 9 Drawing Sheets

PERSONALIZED ADAPTIVE MEETING PLAYBACK

CROSS-REFERENCE PARAGRAPH TO RELATED APPLICATIONS

This application is a continuation of U.S. patent application Ser. No. 17/931,176, filed Sep. 12, 2022, of which the entire content is incorporated herein in its entirety.

BACKGROUND

People spend a significant amount of their time in meetings, presentations, and lectures, such as for school or for work. Moreover, people are attending more meetings more often, as they are working remotely more often and thus have less unplanned interactions with co-workers, often communicating with others via meeting applications including time collaborating or working with teams or groups of people. Often, meetings overlap or particular projects or courses may involve multiple meetings. Consequently, people are spending increasing amounts of time listening to meeting recordings, reviewing their meeting notes, and catching up on missed meetings or content that they missed while attending a meeting. Some content may be more relevant than other content to a particular user.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed toward technologies for improving the functionality of multimedia content generated or presented by computing applications accessible on user computing devices (sometimes referred to herein as mobile devices, laptops, desktops, computers, virtual-reality (VR) headsets, or user devices). In particular, this disclosure provides technologies to programmatically determine, for a segment of a meeting recording, an adaptive playback speed that is specific to a user; and time-stretching, based on the adaptive playback speed, the segment into a time-stretched segment to cause a meeting recording to be provided with the time-stretched segment. To determine an adaptive playback speed, this disclosure provides technologies to determine one or more playback data features from user-meeting data associated with a meeting recording and/or a user. In one example, the user did not attend the meeting, and the meeting recording is shared with the user. Based on the one or more playback data features, this disclosure provides technologies to determine an adaptive playback speed for a segment of the meeting recording. The adaptive playback speed includes a faster or slower playback speed as compared to a default playback speed of the meeting recording. The adaptive playback speed may be personalized for the user, such as a viewer or listener. For example, the technologies provided herein determine one or more playback data features of a meeting recording. Based on the playback data features, it can be determined that a corresponding segment of content includes information that is not relevant (or is relevant) to the user, such that the playback speed of the corresponding segment should be played back faster (or slower) than a default playback speed. In this manner, playback of the meeting recording can be adjusted and personalized so that portions of content more relevant to a user are slowed down or maintained at the default playback speed to improve content consumption, while portions of content less relevant to a user are sped up to a playback speed faster than the default speed to save the user time that would otherwise be spent listening to less relevant content.

In some embodiments, operation of a computer application, such as an online meeting, communications or video hosting application, is configured or modified to execute computer instructions for presenting a graphical user interface (GUI) that provides the meeting recording with a time-stretched segment of the meeting recording. In one example, a user activates or deactivates a GUI feature to enable or disable playback of the meeting recording with the adaptive playback speed or with the default playback speed. In an example, the GUI includes a stream region and a playback timeline region separate from the stream region. The playback timeline region includes an indication of each time-stretch segment of the meeting recording, and the stream region includes the meeting recording being played back based on the time-stretched segments of the meeting recording. While the meeting recording is playing back on the stream region, an indication traverses along the playback timeline region to correspond to progress to completion of the meeting recording. In one example, the playback timeline region includes a visually distinct indication corresponding to the time-stretched segments of the meeting recording, as compared to the segments that are played back at the default speed and not time-stretched.

Such technologies improve the user experience in any of a number of computer applications and platforms. Further, these technologies reduce computational resources and bandwidth associated with a user downloading and playing back a larger file that is longer in duration since certain portions of the meeting recording have not been sped up to generate a more compressed meeting recording. For example, a user may play back certain portions of the meeting recording at the longer default playback speed and instead manually fast forward other portions of the meeting recording, exhausting computational resources associated with servicing the user's manual request for faster playback in real-time. Moreover, in instances where a user decides to view, at the default playback speed, the segments that have been time-stretched, embodiments disclosed herein support on-demand download of these segments. For example, the segments at the default playback speed may be downloaded during times of lower user activity and less computational resource consumption.

BRIEF DESCRIPTION OF THE DRAWINGS

Aspects of the disclosure are described in detail below with reference to the attached drawing figures, wherein.

DETAILED DESCRIPTION

Figure 1:
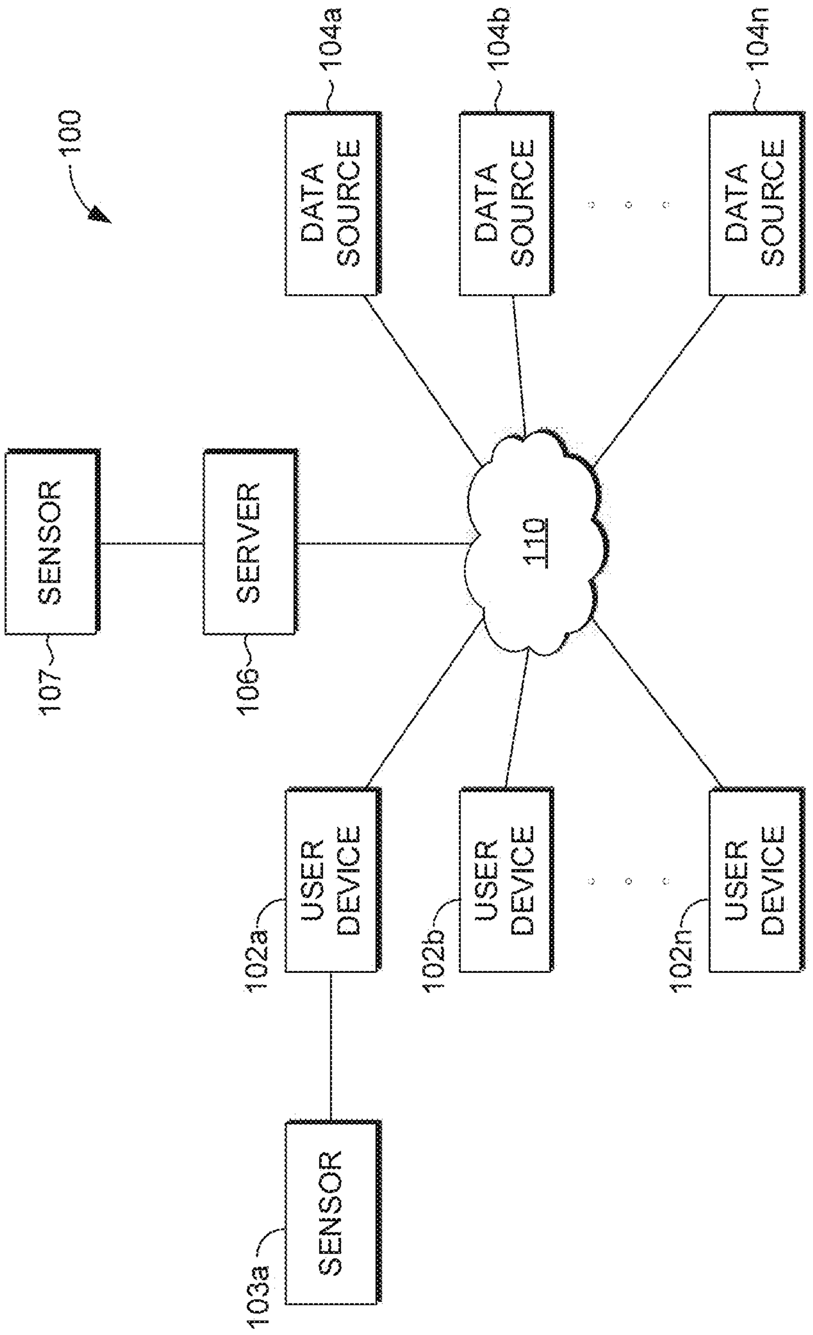
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, such as to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. The method(s) described herein may comprise a computing process performed using any combination of hardware, firmware, and/or software. For example, various functions are carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Aspects of the present disclosure relate to technology for improving electronic communication technology and enhanced computing services for a user, to improve the generation of meeting-recorded content and tools for improving the information that is retrieved by a user viewing or listening to the meeting recording. In particular, certain solutions provided herein include technologies to programmatically determine, for a segment of a meeting recording, a playback speed that is adapted to be specific to a user; and time-stretching, based on the adaptive playback speed, the segment of content to cause a meeting recording to be provided with the time-stretched segment.

In an example, "meeting" refers to a gathering of one or more people that is at least partially hosted or supported by a computing application operating on a computing device, such as a meeting application, video conferencing application, or collaboration application, and for which a user interacts by way of a client computing device. In one example, the meeting includes a hybrid meeting where a portion of attendees are participating in-person, while another portion of attendees are participating via a client computing device as discussed above. For example, a meeting allows for meeting attendees to engage with each other or deliver content to other attendees at or near real-time. Computer application software supporting meetings may also support additional features, such as a chat, a recording control, and so forth. On the other hand, "meeting recording," in one example, refers to a record of at least an aspect or portion of a meeting, such as an audio, video, or multimedia recording of a meeting. For example, a meeting recording corresponds to a stored copy of a meeting that has at least already partially occurred. In some embodiments, the meeting recording is partitioned into segments.

In one example, a "segment of a meeting recording" or "segment" refers to a portion of the meeting, or the meeting recording, having a length of time defined between a start time and an end time. The length of time of the segment of the meeting recording is less than the length of time of the (entire) meeting recording. In one embodiment, the segment has a start time associated with a meeting time of the initiation of an utterance, a gap (for example, a portion of the meeting or meeting recording during which no audio or no visual content is being provided), or a visual transition (for example, starting or ending visual content or transitioning slides in a presentation); and has an end time corresponding to a meeting time when the corresponding utterance, gap, visual transition ends, or a second and subsequent visual transition occurs. In one example, the ending or initiation is determined based on a change in sounds parameters (for example, speaker, frequency (or sound pitch), amplitude (or dynamics or loudness), wave form, wave duration, timbre (or tone color), and so forth) or visual parameters. In one embodiment, the content of the segment shares a common playback data feature, such as an indication of: a speaker, a topic, an audio content, a visual content, an application that is presented, a meeting attendees screen that is presented, or any other playback data feature discussed herein. For example, a first segment of the meeting corresponds to a portion of the meeting during which a first speaker is speaking, a second segment of the meeting corresponds to a portion of the meeting during which a second speaker is speaking, and a third segment of the meeting recording corresponds to a portion of the meeting during which audio gaps (or no audio) occurs. As another example, a first segment corresponds to an audio relating to a first topic, and a second segment corresponds to audio relating to a second topic.

In one example, the "adaptive playback speed" refers to a playback speed of the meeting recording that has been modified, by employing an embodiment disclosed herein, relative to a default playback speed or a user playback speed preference of a meeting recording. In one example, the default playback speed corresponds to the speed at which a live-version of the meeting occurred and was recorded. In one example, the default playback speed includes a playback speed that has not been modified or edited since the meeting was recorded. In one example, the user playback speed preference corresponds to a pre-set playback speed manually assigned by the user to be applied to the entire meeting recording. In one example, the adaptive playback speed corresponds to a faster or slower playback speed as compared to the default playback speed. Example adaptive playback speeds include 0.25 times slower (×0.25 speed), half speed (×0.5 speed), 1.5 times faster (×1.5 speed), and 2 times faster (×2 speed), and so forth, or any speed multiplier there between, to name a few.

To determine the adaptive playback speed, this disclosure provides technologies to determine one or more playback data features from user-meeting data associated with the meeting recording. In one example, a "playback data feature" refers to an aspect of meeting data, which may comprise processed user-meeting data that is used to facilitate determination of the adaptive speed. In this manner, determination of the adaptive speed may be specific to a user. For example, a segment of the meeting recording can be determined to be associated with a different adaptive playback speed for one user than for another user. In one example, the playback data features includes (1) a "user feature" comprising a feature that is specific to a particular user, and/or (2) a "content feature" that is specific to the content being provided and/or that is shared or is general across a plurality of users. By way of example and without limitation, the playback data features include features indicative of, among other measurable properties, a topic of the segment of the meeting recording, a type of the segment of the meeting recording, an identity of a speaker in the segment of the meeting recording, a relationship of the speaker to a user (such as a viewer), a duration of the segment of the meeting recording, a duration of a pause in the segment of the meeting recording, a transition from a first speaker to a second speaker different from the first speaker, a visual transition of the content being presented, a timing constraint associated with a calendar application, a rate of words per period of time, visual feedback indicative of a level of user engagement with the segment of the meeting recording from a wearable device, or contextual metadata expressed as one or more data features indicative of meeting invitees, meeting attendees, or a type of meeting, and the like.

By way of a non-limiting example, a meeting recording covering a company's changes in the last annual quarter are accessed and viewed by different employees of the company, namely, a lawyer and an engineer. Based on the user-meeting data and the playback data features associated with the lawyer, in one example, a computing device determines that content relevant to the lawyer includes legal updates within the company. In another example, based on the user-meeting data and the playback data features associated with the engineer, a computing device determines that content relevant to the engineer includes technical updates within the company. For the lawyer, the segments of the meeting recording not containing legal updates are time-stretched to an adaptive playback speed that is faster than a default playback speed so that the time the lawyer spends listening to or watching this less relevant content is reduced. For the engineer, the segments of the meeting recording not containing technical updates are time-stretched to an adaptive playback speed that is faster than a default playback speed so that the time the engineer spends listening to or watching this less relevant content is reduced. Accordingly, the segments of the meeting that are time-stretched to be played at an adaptive playback speed may differ across users, the adaptive playback speed may differ across users, and so forth.

However, it should be understood that in some embodiments a time-stretched segment is shared across users. In one example, content features of the playback data features are processed to determine that segments of the meeting recording that include a lack of audio or visual content, which may correspond to pauses, breaks or time waiting for attendees to join the meeting, should be played back at a faster playback speed for every user. In one example, these gaps are time-stretched to an adaptive playback speed faster than the default playback speed to reduce time wasted on segments of the meeting recording without audio or visual content.

Figure 3:
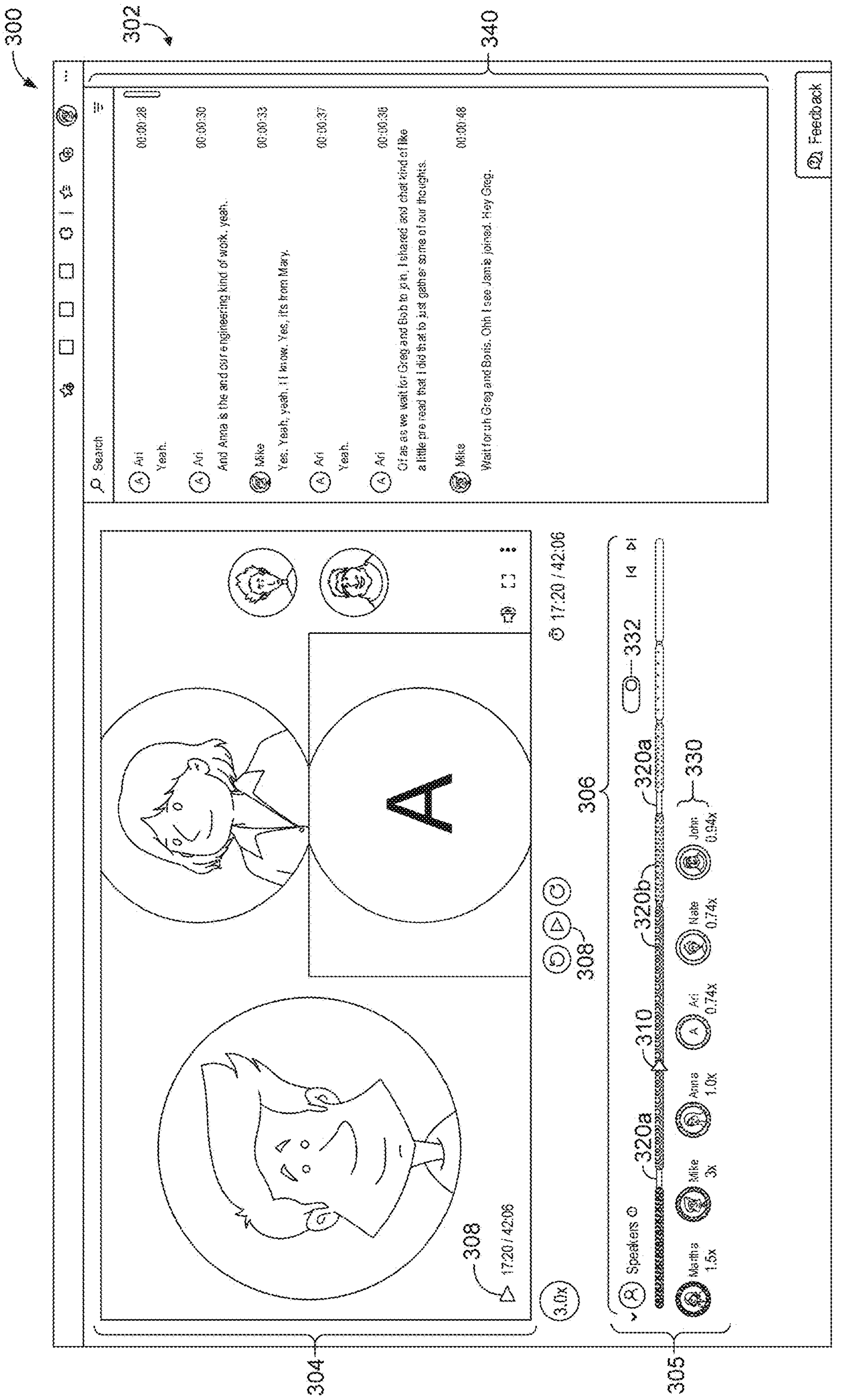
FIG. 3 illustratively depicts an example schematic screenshot from a personal computing device showing aspects of an example graphical user interface, in accordance with an embodiment of the present disclosure.
Figure 4:
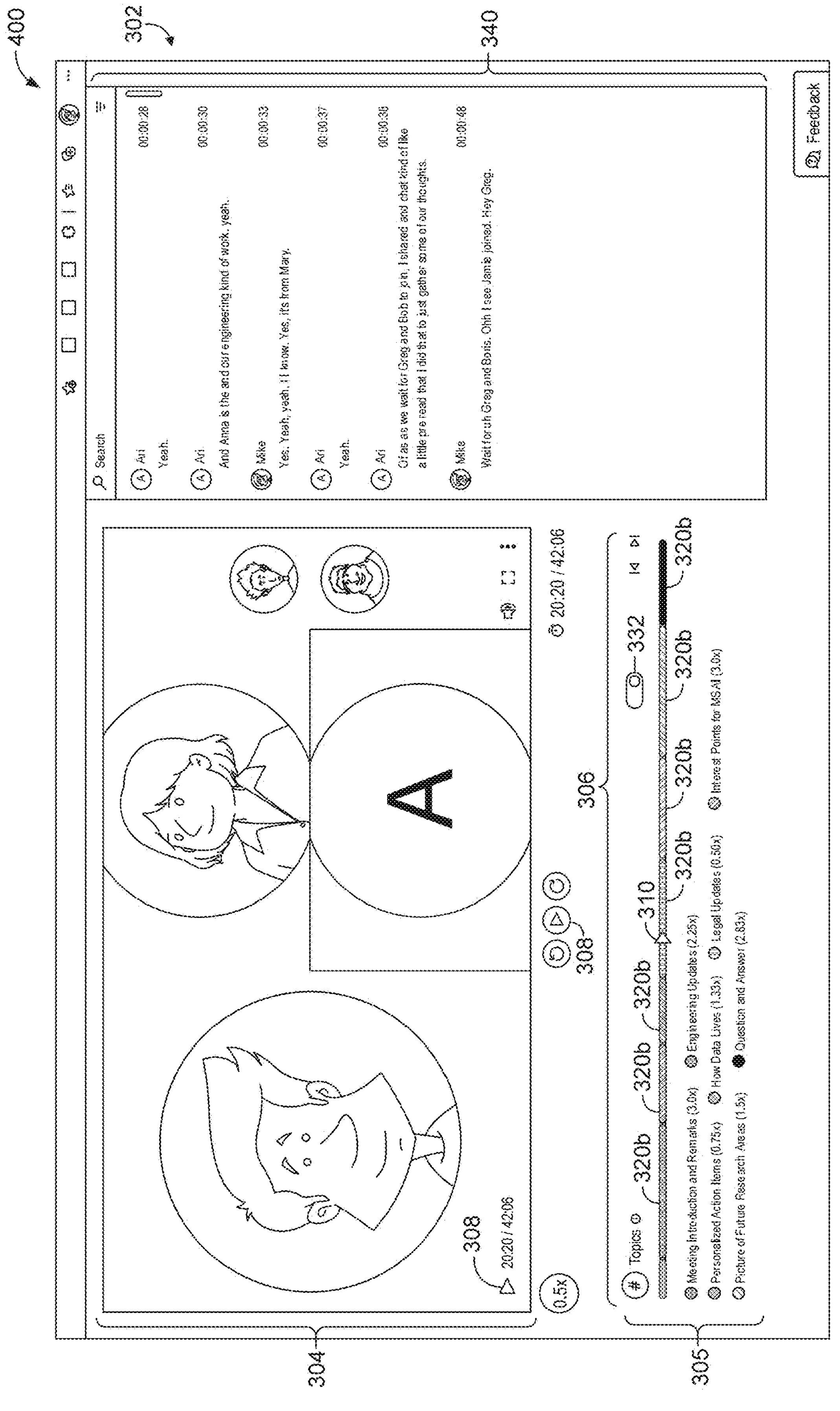
FIG. 4 illustratively depicts an example schematic screenshot from a personal computing device showing aspects of an example graphical user interface, in accordance with an embodiment of the present disclosure.

Embodiments of the present disclosure relate to technology for employing a computer application, such as a communications or video hosting application, configured or modified to execute computer instructions for presenting a graphical user interface (GUI) that provides the meeting recording with the time-stretched segment. In one example, a user activates or deactivates a GUI feature to enable or disable playback of the meeting recording with the adaptive playback speed or with the default playback speed. In an example, the GUI includes a stream region and a playback timeline region separate from the stream region. An example GUI is depicted in FIGS. 3 and 4. In an example, the playback region includes an indication of each time-stretch segment of the meeting recording, and the stream region includes the meeting recording being played back based on the time-stretched segments of the meeting recording. In one example, the playback timeline region includes a visually distinct indication corresponding to the time-stretched segments, as compared to the segments that are played back at the default speed and not time-stretched. For example, the time-stretched segments includes a darker line thickness than the segments of the meeting recording that are played back at the default playback speed and not time-stretched.

In the context of an enterprise meeting recording, for example, a first segment during which the CEO was speaking is time-stretched to a first playback speed, a second segment during which gaps (for example, omitted audio or visual content) is time-stretched to a second playback speed, and a third segment during which the user is speaking is time-stretched to a third playback speed. The first, second, and third segments can be presented on a timeline on the playback timeline region. In one example, as the meeting recording is played on the stream region, the playback timeline region includes an indication that traverses along the playback timeline region to correspond to progress to completion of the meeting recording. In this manner, the indication can serve as a visual indication of progress through the meeting recording. Additionally or alternatively, the indication can serve as a notification of when a segment of meeting recording is being time-stretched to be played back at a speed different from the default playback speed.

In some embodiments, the segments are ranked based on the user-meeting data, or a playback data feature of the user-meeting data. In one embodiment, the adaptive playback speed for each of the segments is based on the ranking that is determined based on a respective weight of each segment. In one example, a weight is determined for each segment, such that a higher weight corresponds to a higher ranking and a lower weight corresponds to a lower ranking or vice versa. In this example, the higher ranked segment is associated with a slower adaptive playback speed, while the lower ranked segment is associated with a faster adaptive playback speed. In one embodiment, the computing device applies the respective adaptive playback speeds a threshold n-number of the highest ranked segments and a threshold n-number of the lowest ranked segments, where n is a real integer such as 1, 2, 3, 4 and so forth.

Such technologies improve the user experience in any of a number of computer applications and platforms and reduce computational resources associated with a user having to download or stream an entire meeting recording that has not been reduced in duration by employing the embodiments discussed herein. As such, network bandwidth associated with streaming meeting recordings can be saved and real-located to other uses since the embodiments described herein present users with meeting recordings that can be compressed or smaller in size due to the time-stretching of segments of the meeting recording. Additionally, users can lose focus especially when content of the meeting recording that is less relevant to the user is being presented with the same speed as content that is relevant to the user. To address this issue, the embodiments disclosed herein improve the ability for a user to efficiently watch or re-watch a meeting recording without having to consume less relevant segments of the meeting recording with the same speed as the relevant segments of content.

Overview of Technical Problems, Technical Solutions, and Technological Improvements As previously described, people spend significant time communicating in meetings with other people, including time collaborating or working in teams, and it can be helpful for a user to have segments of content time-stretched so that the segment can be played back at different speeds to enhance the efficiency of content consumption. For example, when a user has a meeting with or communicates with a team, it would be helpful to provide the user with tools for playing back the meeting recording in such a manner that is tailored to the user and/or based on the content of the meeting recording.

However, as anyone who has ever listened to recorded meetings can attest, viewing a meeting recording is a time consuming and inefficient process, especially where a user is only interested in reviewing certain information but must listen to entire meeting recordings because they do not know where to focus their attention on their review. In particular, existing conventional technologies lack computing functionality to determine an adaptive playback speed for a segment of the meeting recording and provide a time-stretched segment of the meeting recording. Additionally, many conventional technologies lack computing functionality to programmatically determine and provide visual indications on a playtime timeline region visually differentiating the time-stretched segments from the segments playback at the default playback speed, nor does there exist computing functionality to empower users to customize the playback speed on the timeline to improve user computing experiences. Existing approaches may provide a timeline with a selectable feature for changing playback speed, but such approach blindly changes the speed of content until the selectable feature is selected again to revert the playback speed. Unfortunately, this approach relies on users controlling the speed, which further contributes to the user's loss of attention while streaming the video. Further compounding this problem, the playback speed of exiting approaches is pre-set and fails to automatically be finely adjusted to emphasize segments of the meeting video by reducing the playback speed relative to deemphasized segments of the meeting being played at a faster speed.

Accordingly, automated computing technology for programmatically determining, surfacing, and/or utilizing user-meeting data to determine an adaptive playback speed and generating a time-stretched segment of the meeting recording, as provided herein, can be beneficial for enabling improved computing applications and an improved user computing experience. Further, embodiments of this disclosure address a need that arises from a large scale of operations created by software-based services that cannot be managed by humans. The actions/operations described herein are not a mere use of a computer, but address results of a system that is a direct consequence of software used as a service offered in conjunction with user communication through services hosted across a variety of platforms and devices. Further still, embodiments of this disclosure enable an improved user experience across a number of computer devices, applications, and platforms. Further still, embodiments described herein enable certain segments of content to be programmatically surfaced and presented at a playback speed determined based on playback data features associated with user-meeting data without requiring computer tools and resources for a user to manually perform operations to produce this outcome. Even if a user wanted to manually change playback speed, existing computer infrastructure and logic does not allow the playback speed to deviate from preset playback speeds. In this way, some embodiments, as described herein, reduce or eliminate a need for certain databases, data storage, and computer controls for enabling manually performed steps by a person, to search, identify, assess, view a video, and configure (for example, by hard-coding) playback of the meeting recording, thereby reducing the consumption of computing resources, such as those associated with running an entire video so that a person can manually edit the playback speed and store various edited copies on a server or computing device.

ADDITIONAL DESCRIPTION OF THE EMBODIMENTS

Turning now to FIG. 1, a block diagram is provided showing an example operating environment 100 in which some embodiments of the present disclosure may be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities may be carried out by hardware, firmware, and/or software. For instance, some functions are carried out by a processor executing instructions stored in memory.

Among other components not shown, example operating environment 100 includes a number of user computing devices, such as user devices 102*a* and 102*b* through 102*n*; a number of data sources, such as data sources 104*a* and 104*b* through 104*n*; server 106; sensors 103*a* and 107; and network 110. It should be understood that operating environment 100 shown in FIG. 1 is an example of one suitable operating environment. Each of the components shown in FIG. 1 is implemented via any type of computing device, such as computing device 800 illustrated in FIG. 8, for example. In one embodiment, these components communicate with each other via network 110, which include, without limitation, one or more local area networks (LANs) and/or wide area networks (WANs). In one example, network 110 comprises the internet and/or a cellular network, amongst any of a variety of possible public and/or private networks.

It should be understood that any number of user devices, servers, and data sources can be employed within operating environment 100 within the scope of the present disclosure. Each may comprise a single device or multiple devices cooperating in a distributed environment, such as the distributed computing device 800 in FIG. 8. For instance, server 106 is provided via multiple devices arranged in a distributed environment that collectively provide the functionality described herein. Additionally, other components not shown may also be included within the distributed environment.

User devices 102*a* and 102*b* through 102*n* can be client user devices on the client-side of operating environment 100, while server 106 can be on the server-side of operating environment 100. Server 106 can comprise server-side software designed to work in conjunction with client-side software on user devices 102*a* and 102*b* through 102*n* so as to implement any combination of the features and functionalities discussed in the present disclosure. This division of operating environment 100 is provided to illustrate one example of a suitable environment, and there is no requirement for each implementation that any combination of server 106 and user devices 102*a* and 102*b* through 102*n* remain as separate entities.

User devices 102*a* and 102*b* through 102*n* may comprise any type of computing device capable of use by a user. For example, in one embodiment, user devices 102*a* and 102*b* through 102*n* are the type of computing device described in relation to FIG. 8 herein. By way of example and not limitation, a user device is embodied as a personal computer (PC), a laptop computer, a mobile device, a smartphone, a smart speaker, a tablet computer, a smart watch, a wearable computer, a personal digital assistant (PDA) device, a virtual-reality (VR) or augmented-reality (AR) device or headset, music player or an MP3 player, a global positioning system (GPS) device, a video player, a handheld communication device, a gaming device or system, an entertainment system, a vehicle computer system, an embedded system controller, a camera, a remote control, an appliance, a consumer electronic device, a workstation, any other suitable computer device, or any combination of these delineated devices.

Data sources 104*a* and 104*b* through 104*n* may comprise data sources and/or data systems, which are configured to make data available to any of the various constituents of operating environment 100 or system 200 described in connection to FIG. 2. For instance, in one embodiment, one or more data sources 104*a* and 104*b* through 104*n* provide (or make available for accessing), to meeting-data collection component 210 of FIG. 2, user-meeting data. Data sources 104*a* and 104*b* through 104*n* may be discrete from user devices 102*a* and 102*b* through 102*n* and server 106 or may be incorporated and/or integrated into at least one of those components. In one embodiment, one or more of data sources 104*a* and 104*b* through 104*n* comprise one or more sensors, which are integrated into or associated with one or more of the user device(s) 102*a*, 102*b* through 102*n* or server 106. Examples of data made available by data sources 104*a*, 104*b* through 104*n* are described further in connection to meeting-data collection component 210 or storage 225 of FIG. 2.

Figure 2:
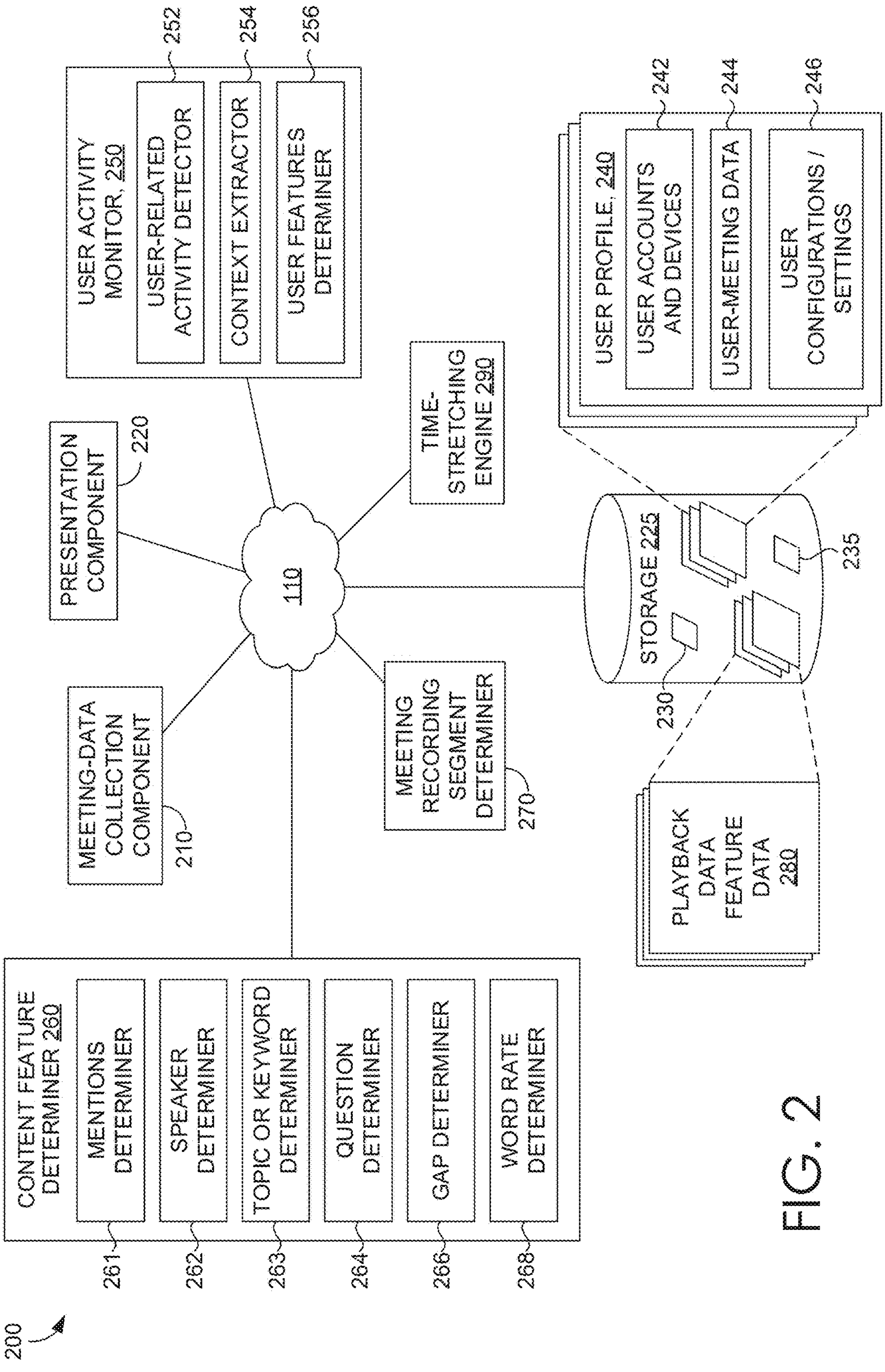
FIG. 2 is a diagram depicting an example computing architecture suitable for implementing aspects of the present disclosure.

Operating environment 100 can be utilized to implement one or more of the components of system 200, described in FIG. 2, including components for collecting user-meeting data; monitoring user activity to determine playback data features; receiving user preferences, and/or similar categories of data regarding content features of the meeting recording; processing data to determine a segment of the meeting recording; time-stretching a segment; and/or consuming or presenting content to users. Operating environment 100 can also be utilized for implementing aspects of methods 500, 600, and 700 in FIGS. 5, 6, and 7, respectively.

Referring now to FIG. 2, with continuing reference to FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that are implemented as discrete or distributed components or in conjunction with other components, and in any suitable combination and location. In one example, the computing device of FIG. 8 and the distributed computing device of FIG. 9 performs aspects of the system 200 of FIG. 2.

Example system 200 includes network 110, which is described in connection to FIG. 1, and which communicatively couples components of system 200, including meeting-data collection component 210, presentation component 220, user activity monitor 250, content feature determiner 260, meeting recording segment determiner 270, time-stretching engine 290, and storage 225. In some embodiments, user activity monitor 250 (including its subcomponents 252, 254, and 256), content feature determiner 260 (including its subcomponents 261, 262, 263, 264, 266, and 268), time-stretching engine 290, meeting-data collection component 210, and presentation component 220, are embodied as compiled computer instructions or functions, program modules, computer software services, or an arrangement of processes carried out on one or more computer systems, such as distributed computing device 900, described in connection to FIG. 9.

In one embodiment, the functions performed by components of system 200 are associated with one or more computer applications, services, or routines, such as an online meeting application, a video-viewing application, a communications or collaboration application, or an organizational explorer application. In these embodiments, the functions operate to determine or provide playback data feature data 280 (including, without limitation, the outputs of the content feature determiner 260, and so forth). In particular, such applications, services, or routines may operate on one or more user devices (such as user device 102*a* of FIG. 1) or servers (such as server 106 of FIG. 1). Moreover, in some embodiments, these components of system 200 are distributed across a network, including one or more servers (such as server 106) and/or client devices (such as user device 102*a* of FIG. 1) in the cloud, such as described in connection with FIG. 9, or reside on a user device, such as user device 102*a* of FIG. 1. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), and so forth. Additionally, although functionality is described herein with regard to specific components shown in example system 200, it is contemplated that in some embodiments, functionality of these components is shared or distributed across other components.

Continuing with FIG. 2, meeting-data collection component 210 is generally configured to access or receive (and in some cases also identify) user-meeting data, which include data associated with a user (such as a user viewing the meeting recording or a user that attended the meeting), data associated with a meeting, or data associated with a meeting recording from one or more data sources, such as data sources 104*a* and 104*b* through 104*n* of FIG. 1. In some embodiments, meeting-data collection component 210 is employed to facilitate the accumulation of data of a particular meeting, or data of a particular user or group (or in some cases, a plurality of users including crowdsourced data) for user activity monitor 250 or its subcomponents, content feature determiner 260 or its subcomponents, the meeting recording segment determiner 270, or the time-stretching engine 290. In one embodiment, the data is received (or accessed), and optionally accumulated, reformatted, and/or combined, by meeting-data collection component 210 and stored in one or more data stores such as storage 225, where it is available to other components of system 200. For example, the user-meeting data is stored in or associated with a user profile 240, as described herein, such as in user-meeting data 244 of user profile 240, or is stored in or associated with the playback data feature data 280, as described herein. In some embodiments, any personally identifying data (for example, user data that specifically identifies particular users) is either not uploaded or otherwise provided from the one or more data sources, is not permanently stored, is de-identified, and/or is not made available to other components of system 200. In addition or alternatively, a user may opt into or out of services provided by the technologies described herein and/or select which user-meeting data and/or which sources of user-meeting data are to be captured and utilized by these technologies.

User-meeting data 244, in one example, comprises any information that is related to a person and that person's interactions during a meeting or previous meetings, as well as information related to the meeting and/or meeting recording. In one embodiment, user-meeting data is received from a variety of sources and available in a variety of formats. By way of example and without limitation, user-meeting data comprises at least one of: audio information (for example, an audio file having a recording of sound and spoken content from the meeting); transcript information (for example, a document having text that has been extracted out of a meeting (or meeting recording) based on audio of the meeting (or meeting recording) and/or a chat of the region); contact information (for example, email, instant message, phone, and so forth associated with meeting attendees or meeting invitees, and can also specify a person's communication preferences); location information (for example, a person's current location or location of a particular office where they work); presence; user-related activity, which may comprise activity relevant to a user or group member, such as communications information (for example, past email, meetings, chat sessions, communication patterns or frequency, information about a user or other meeting attendees/invitees that the user had a meeting with or has an upcoming meeting with, or information about communications between a group member and one or more users), files access (for example, a file created, modified, or shared), social media or online activity, such as a post to a social-media platform or website, subscription information, information regarding topics of interest to a user, or other user-related activity that may be determined via a user device (such as user device 102*a* of FIG. 1); task-related information (for example, an outstanding task that the user has with regard to a meeting or outstanding tasks that meeting attendees have with respect to the user); information about a group or group member that they choose to share (for example, birthday, anniversary, etc.); or information in common with other users (for example, common project teams, work groups, backgrounds, education, interests, or hobbies). Additional examples of user-meeting data are described herein.

In some embodiments, user-meeting data 244 received via meeting-data collection component 210 is obtained from a data source (such as data source 104*a* of FIG. 1, which is a meeting hosting site, a social networking site, a professional networking site, a corporate network, an organization's intranet or file share, or other data source containing user-meeting data) or determined via one or more sensors (such as sensors 103*a* and 107 of FIG. 1), which are on or associated with one or more user devices (such as user device 102*a* of FIG. 1), servers (such as server 106 of FIG. 1), and/or other computing devices. In one example, a sensor includes a function, routine, component, or combination thereof for sensing, detecting, or otherwise obtaining information such as user-meeting data from a data source 104*a*, and is embodied as hardware, software, or both. By way of example and not limitation, user-meeting data includes data that is sensed, detected, or determined from one or more sensors (referred to herein as sensor data), such as location information of mobile device(s), properties or characteristics of the user device(s), user-activity information for example: app usage; online activity; searches; voice data such as automatic speech recognition; activity logs; communications data, including calls, texts, chats, messages, and emails; document comments; website posts; other user-meeting data associated with communication events, including user history, session logs, application data, contacts data, calendar and schedule data (including blocks of time during which nothing is schedule or blocks of time marked as occupied because an event is scheduled), notification data, social-network data, e-commerce activity, user-account(s) data (which may include data from user preferences or settings associated with a personalization-related application, a personal assistant application or service, an online service or cloud-based account such as Microsoft 365, an entertainment or streaming media account, a purchasing club or services); global positioning system (GPS) data (for example, used to determine a length of travel time to an event scheduled as part of the calendar and schedule data); other user device data (which can include device settings, profiles, network-related information, payment or credit card usage data, or purchase history data); other sensor data that is sensed or otherwise detected by a sensor (or other detector) component(s), including data derived from a sensor component associated with the user (including location, motion, orientation, position, user-access, user-activity, network-access, user-device charging, or other data that is capable of being provided by one or more sensor component); data derived based on other data (for example, location data that can be derived from Wi-Fi, cellular network, or IP address data), and nearly any other source of data that is sensed, detected, or determined as described herein.

User-meeting data 244, particularly in the form of context data or contextual information regarding a particular user, can be received by meeting-data collection component 210 from one or more sensors and/or computing devices associated with the user. In some embodiments, meeting-data collection component 210, user activity monitor 250 or its subcomponents, meeting recording segment determiner 270, content feature determiner 260 or its subcomponents, or other components of system 200 determine interpretive data from received user-meeting data. Interpretive data corresponds to data utilized by the components or subcomponents of system 200 that comprises an interpretation from processing raw data, such as a transcript extracted from raw audio from the meeting or meeting recording, calendar and scheduling data, and/or topic information interpreted from a meeting recording, such as a chat of a meeting, a transcript, and so forth. Interpretive data can be used to provide context to user-meeting data, which can support determinations or inferences carried out by components of system 200. Moreover, it is contemplated that some embodiments of the disclosure utilize user-meeting data alone or in combination with interpretive data for carrying out the objectives of the subcomponents described herein. It is also contemplated that some user-meeting data are processed by the sensors or other subcomponents of meeting-data collection component 210 not shown, such as for interpretability by meeting-data collection component 210. However, embodiments described herein do not limit the user-meeting data to processed data and may include raw data or a combination thereof, as described above.

In some respects, user-meeting data 244 is provided in user-meeting data streams or signals. A "signal" can be a feed or stream of user-meeting data from a corresponding data source. For example, a user signal could be from a smartphone, a home-sensor device, a GPS device (for example, for location coordinates), a vehicle-sensor device, a wearable device, a user device, a gyroscope sensor, an accelerometer sensor, a camera device (for example, of a computing device), a calendar service, an email account, a credit card account, or other data sources. In some embodiments, meeting-data collection component 210 receives or accesses data continuously, periodically, as it becomes available, or as needed. In some embodiments, the user-meeting data, which includes data indicative of the user's interactions during a meeting or while streaming a recording of the meeting (or previous meeting recordings), and which is received by meeting-data collection component 210 is stored in storage 225, such as in user-meeting data 244 or playback data feature data 280.

User activity monitor 250 is generally responsible for monitoring user activity for information that may be used for determining user-meeting data 244 for one or more users. In some embodiments, user-meeting data 244 associated with a particular user determined via user activity monitor 250 comprises contextual information. In some embodiments, this user-meeting data is utilized by other components of system 200 to infer an intent of the particular user and/or to further determine playback data feature data 280 and/or a segment to time-stretch to a determined playback speed, which is used to generate an updated meeting recording. In particular, embodiments of user activity monitor 250 determine user-meeting data associated with a particular user, which includes user-related activity data and/or context data, and/or provides the determined user-meeting data as structured data, such as one or more playback data features, so that it is usable by other components of system 200. For instance, as further described herein, the user-meeting data is used by content feature determiner 260 to determine at least one content feature used to determine a playback speed to which a segment is time-stretched to be played back. In some embodiments, user-meeting data 244 determined by user activity monitor 250 or its subcomponents is used to determine contextualized events of interest for the user. The user-meeting data 244 determined by user activity monitor 250 or its subcomponents may also be stored in a user profile 240 associated with a user, such as in user-meeting data 244 of user profile 240, where it is accessible to other components of system 200. Similarly, in some implementations, the content feature determined by content feature determiner 260, or its subcomponents, are stored in storage 225 as content feature data; or are stored in user profile 240, such as in user-meeting data 244 of user profile 240, where it is accessible to other components of system 200.

In some embodiments, user activity monitor 250 determines current or near-real-time user activity information and also determines historical user activity information, which is determined based on gathering observations of user activity over time, accessing user logs of past activity (such as communication history, a user activity during a meeting, and the like, for example). Accordingly, user activity monitor 250 can determine current and historic user activity information that is usable by user activity monitor 250 or other components of system 200 to determine, for example, that: a meeting is taking place; a meeting has occurred; a user is listed as an invitee for a meeting; a user is listed as an attendee for the meeting; a role of a user within an organization (for example, engineer or lawyer); a description of a meeting; a time and date during which the meeting is taking or took place; conferences or meetings in which the user spoke; and an indication that the particular user and the other users have attended meetings together, have similar interests or similar characteristics, have worked in the same office or location, or that the particular user and the other user share a connection with a third user.

In some embodiments, the user-meeting data determined by user activity monitor 250 (or its subcomponents) includes user-related activity information from one or multiple user devices associated with a user and/or from cloud-based services associated with a user (such as email, meeting information sources, calendars, social media, or similar information sources), and/or includes contextual information associated with the user activity or user-meeting data. For example, information about user activity on a particular device or cloud-based service is used to determine a context associated with the user, which is used for determining an adaptive playback speed for a segment of the meeting recording and the corresponding start and end time associated with the segment. In an embodiment, user activity monitor 250 includes one or more computing applications or services that analyze information detected via one or more user devices used by a user and/or cloud-based services associated with the user to determine activity information and/or contextual information. Information about user devices associated with a user may be determined from the user-meeting data 244 made available via meeting-data collection component 210 and be provided to user activity monitor 250 or other components of system 200. More specifically, in some implementations of user activity monitor 250, a user device is identified by detecting and analyzing characteristics of the user device, such as device hardware, software (such as operating system (OS)), network-related characteristics, user accounts accessed via the device, and similar characteristics. For example, information about a user device is determined by using functionality of many operating systems to provide information about the hardware, OS version, network connection information, installed application, or the like. In one embodiment, the number of time-stretched segments presentable (for example, on the playback timeline region) by a user device are based on the type of user device. For example, a mobile device presents less time-stretched segments on the playback timeline region than a laptop, at least because there is more screen size on the laptop.

Some embodiments of user activity monitor 250 or its subcomponents determine a device name or identification (device ID) for each device associated with a user. In one example, this information about the identified user device(s) associated with a user is stored in a user profile associated with the user, such as in user accounts and devices 242 of user profile 240. In an embodiment, a user device is polled, interrogated, or otherwise analyzed to determine information about the device. In one example, this information is used for determining a label or identification of the device (for example, a device ID) so that user interaction with the device is recognized from user-meeting data by user activity monitor 250. In some embodiments, users declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account (MSA), email account, social network, or the like, are identified and determined to be associated with the user.

As shown in example system 200, user activity monitor 250 comprises a user-related activity detector 252, context extractor 254, and user features determiner 256. In some embodiments, user activity monitor 250, one or more of its subcomponents, or other components of system 200 determines interpretive data based on received user-meeting data, such as described previously. It is contemplated that embodiments of user activity monitor 250, its subcomponents, and other components of system 200 can use the user-meeting data and/or interpretive data for carrying out the objectives of the subcomponents described herein. Additionally, although several examples of how user activity monitor 250 and its subcomponents identify user-related activity information are described herein, many variations of user activity identification and user activity monitoring are possible in various embodiments of the disclosure.

User-related activity detector 252, in general, is responsible for determining (or identifying) that a user action or user-activity event has occurred. Embodiments of user-related activity detector 252 are used for determining current user activity or historical user actions. Some embodiments of user-related activity detector 252 monitor user-meeting data for activity-related features or variables corresponding to various user activity such as indications of user inputs into a chat, locations or visits, information about meetings attended, identities of speakers in the meeting, applications launched or accessed, files accessed or shared, websites navigated to, media played, calendar events accepted, or other user activities. Additionally, some embodiments of user-related activity detector 252 extract, from the user-meeting data, information about user-related activity, which includes current user activity, historical user activity, and/or related information such as context.

Alternatively, or in addition, in some embodiments context extractor 254 determines and extracts context. Similarly, in some embodiments, user features determiner 256 extracts information about a user and a meeting, such as playback data features, based on an identification of the activity determined by user-related activity detector 252. Examples of extracted user-related activity information include user location, app usage, online activity, searches, communications such as chat, call, or message information, types of meetings attended (including the duration of meeting, topics of the meeting, and speakers of the meeting), usage duration, application data (for example, emails, meeting invites, messages, posts, user status, notifications, etc.), or nearly any other data related to user interactions with the user device or user activity via a user device. For example, a user's location is determined using GPS, indoor positioning (IPS), or similar communication functionalities of a user device associated with a user.

In some embodiments, data determined from user-related activity detector 252 is provided to other subcomponents of user activity monitor 250 or other components of system 200, or is stored in a user profile associated with the user, such as in user-meeting data 244 of user profile 240. In some embodiments, user-related activity detector 252 or user activity monitor 250 (or its other subcomponents) performs conflation on detected user-meeting data. For example, overlapping information is merged and duplicated, or redundant information is eliminated.

In some embodiments, the playback data features are interpreted to determine that particular user activity has occurred. For example, in some embodiments, user-related activity detector 252 employs user-activity event logic, which includes rules, conditions, associations, classification models, or other criteria to identify user activity. In one embodiment, user activity event logic includes comparing user activity criteria with the user-meeting data in order to determine that an activity event has occurred. Similarly, activity event logic may specify types of detected user-device interaction(s) that are associated with an activity event, such as navigating to a portion of a meeting recording, uttering a command, inputting a user input into a meeting chat, downloading meeting recordings, or launching an app. In some embodiments, a series or sequence of user device interactions is mapped to an activity event, such that the activity event is detected upon determining that the user-meeting data indicates that the series or sequence of user interactions has been carried out by the user.

In some embodiments, user-related activity detector 252 runs on or in association with each user device for a user. In one embodiment, user-related activity detector 252 includes functionality that polls or analyzes aspects of the operating system to determine user activity related features (for example, installed or running applications or file accesses and modifications), network communications, and/or other user actions detectable via the user device including sequences of actions.

Context extractor 254 is generally responsible for determining a context associated with user-related activity or user-meeting data. As further described herein, in one embodiment, a context (or context logic) is used to determine a segment or a corresponding adaptive playback speed, to assemble or format the segment on a playback timeline for presentation to a user, or for consumption by a computing application. By way of example, a context comprises information about a user's current activity, such as application usage, meeting-recording consumption time, communication or interaction during a meeting or while watching a meeting recording; and/or a user's interaction with a chat, a text window, or other suitable interactions. For instance, a context can indicate types of user activity, such as a user attending or scheduling a meeting, sending a message (to the entire audience chat or directly to one or more other users), or viewing a meeting recording. Alternatively, or in addition, a user explicitly provides a context, such as performing a query for a particular topic or meeting, which is performed via a meeting hosting application, an organizational explorer application, and the like. In one embodiment, a context includes information about a meeting or meeting recording with which the user is interacting or accessing information about, as in where a user hovers their mouse over an indication of a meeting, meeting recording, or other suitable GUI elements.

Some embodiments of context extractor 254 determine context related to a user action or activity event, such as people entities identified in a user activity or related to the activity (for example, recipients of a message or chat sent by the user, which is sent to an alias corresponding to the audience or meeting attendees), which includes nicknames used by the user (for example, "professor" and "classmate," referring to specific entities identified in the user's contacts by their actual names, or group names such as "project team" or "book club," which refer to specific groups of people identifiable from user-meeting data), and utilize a named-entity extraction model or named-entity recognition model. In one embodiment, context extractor 254 determines related information or, which includes information about a user's focus on previous meeting recording. By way of example and not limitation, this includes context features such as: meeting-attendee data; meeting-invitee data; contextual information about a type of meeting; other information about the meeting recording such as a description of the meeting, topics covered by the meeting, and so forth; information detected by sensor(s) on user devices associated with the user that is concurrent or substantially concurrent to the detected user activity; or any other data related to the user activity that is detectable and used for determining a context of the user-related activity.

In some embodiments, context extractor 254 comprises one or more applications or services that parse or analyze information detected via one or more user devices used by the user and/or cloud-based services associated with the user to identify, extract, or otherwise determine a user-related or user-device-related context. Alternatively, or in addition, some embodiments of context extractor 254 monitor user-meeting data, such as that received by meeting-data collection component 210 or determined by user-related activity detector 252, for information that is used for determining a user context. In some embodiments, this information comprises features (sometimes referred to herein as "variables") or other information regarding specific user-related activity and related contextual information. Some embodiments of context extractor 254 determine, from the monitored user-meeting data, a user context associated with a particular user, user device, or a plurality of users (such as a specific group of people, a group of people sharing a role within an organization, a student, a professor, or faculty) and/or user devices. In some embodiments, a user context determined by context extractor 254 is provided to other components of system 200 or stored in a user profile 240 associated with a user, such as in user-meeting data 244 of user profile 240, where it is accessed by other components of system 200.

User features determiner 256 is generally responsible for determining or extracting one or more playback data features (or variables) characterizing the user or meeting, and/or for determining structured user data associated with a user or meeting. In one embodiment, playback data features are determined from information about user-meeting data received from meeting-data collection component 210 or from user-related activity data, and include context data determined by user activity monitor 250. In some embodiments, user features determiner 256 receives information from one or more of these other components of system 200 and processes the received information to determine one or more playback data features that are specific to a user. For example, user-meeting data 244 processed by user features determiner 256 comprises unstructured, semi-structured, or structured data about a user (or other users). In some embodiments, this received user-meeting data is converted into a structured data schema or record, a feature vector, one or more data feature-value pairs, or other data record that is usable for determining a content feature, an adaptive playback speed, and any other aspect of the embodiments disclosed herein. In one example, the playback data features or structured user-meeting data determined by user features determiner 256 are provided to other components of system 200 or stored in a user profile associated with a user, such as in user-meeting data 244 of user profile 240, where it is accessed by other components of system 200.

Examples of playback data features determined or extracted by user features determiner 256 include, without limitation: data from information sources associated with the user, such as an organizational chart or employment data (for example, who a user reports to, works with, manages (or who reports to a user)); a user's role; information about project team(s), which can include project-team members, or similar information; social media or social collaboration information sources (for example, the user's LinkedIn® connections or GitHub® contributions or collaborations); location-related features; venue-related information associated with the location or other location-related information; other users present at a venue or location; time-related features; current-user-related features, which include information about the current or recent user of the user-device; user device-related features, such as device type (for example, desktop, tablet, mobile phone, fitness tracker, heart rate monitor, or other types of devices), hardware properties or profiles, OS or firmware properties, device IDs or model numbers, network-related information, position/motion/orientation-related information about the user device, network usage information, app usage on the device, user account(s) accessed or otherwise used (such as device account(s), OS level account(s), or online/cloud-service related account(s) activity, such as Microsoft® MSA account, online storage account(s), email, calendar, meetings, or social networking accounts); content-related features, such as meeting topics, presentations, a text transcript of the meeting (that is correlated to a timing or duration of the meeting, a speaker of the meeting, or topic), or attendees; user activity, such as verbal commands, annotations to the meeting recording, searches, browsed websites, purchases, social networking activity, communications sent or received including social media posts; or any other features that are detected or sensed and used for determining data associated with or characterizing a user or meeting.

Some embodiments of user features determiner 256, or more generally user activity monitor 250, can determine interpretive or semantic data from the user-meeting data, which is used to determine playback data features or other structured user data. For example, while a user-activity feature indicates a location visited by the user, a semantic analysis determines information about the location, such as that the location is a gym, a coffee house, or a company office, or to determine other data associated with detected user activity or user data. Thus, in one embodiment, the semantic analysis determines additional user-activity related features or user data that is semantically related to other data and used for further characterizing the user or for determining a context.

In one embodiment, a semantic analysis is performed on at least a portion of user-meeting data to characterize aspects of the user-meeting data. For example, in some embodiments, user-related activity features is classified or categorized (such as by type, time frame or location, work-related, home-related, themes, related entities, other user(s) (such as communication to or from another user) and/or relation of the other user to the user (for example, family member, close friend, work acquaintance, boss, or the like, or other categories), or related features are identified for use in determining a similarity or relational proximity to other user-related activity events. In some embodiments, a semantic analysis utilizes a semantic knowledge representation, such as a relational knowledge graph. For example, a semantic analysis utilizes semantic analysis logic, including rules, conditions, or associations to determine semantic information related to a user activity. For example, a user-related activity event comprising a message sent to another meeting attendee during the meeting is characterized as a work-related activity, which is used to infer a relationship that the user works with the message recipient. As another example, semantic analysis is also used to further determine or characterize a context, such as determining that a topic of a meeting that has been watched by the user is associated with user-related activity corresponding to a topic of interest based on time spent or frequency the user has accessed the meeting recording or portion of the meeting recording. For example, the user's topic of interest is determined (using semantic analysis logic) to be the topic of the meeting recordings the user has spent the most time watching. Similarly, the semantic analysis can determine other suitable events of interest.

Continuing with FIG. 2, content feature determiner 260 is generally responsible for determining the content feature and corresponding time (for example, a start time that the content feature started and an end time at which the content feature ended during the meeting or meeting recording) based on user-meeting data. In one example, the content feature is specific to the meeting recording and is shared across viewers (for example, the users). In one embodiment, the content feature determiner 260 accesses user-meeting data 244 of the meeting recording from the storage 225 to determine the content features. Embodiments of content feature determiner 260 determine and generate a content feature and associated event time based on the user activity monitor 250, the meeting-data collection component 210, and or the user profile 240. Thus, in one example, information about a content feature to be generated is received from the user activity monitor 250 or the user-meeting data 244 in storage 225. In one embodiment, the content feature and associated data as generated and determined by the content feature determiner 260 (or its subcomponents) is stored as playback data feature data 280, where it is used by other components or subcomponents of system 200, such as the meeting recording segment determiner 270 and the time-stretching engine 290. In one example, a content feature determined by content feature determiner 260 is provided to the meeting recording segment determiner 270 to determine a segment of the meeting recording or provided to the time-stretching engine 290 to time-stretch a segment. In some embodiments, the content feature determined by content feature determiner 260 (or its subcomponents) comprises one or more content features, each identifying and characterizing content associated with a segment of the meeting recording.

Embodiments of content feature determiner 260 determine the content feature. In one embodiment, the content feature determiner 260 determines the content feature for a segment determined by the meeting recording segment determiner 270. In another embodiment, the content feature determiner 260 determines the content feature and provides the content feature for the meeting recording segment determiner 270 to determine a segment. As described above, in one example, the content feature is specific to a segment or a meeting recording, is shared across users, or is generic across users. For example, the meeting recording has similar content features for the various users who view or listen to the meeting recording. Embodiments of content feature determiner 260 determine the content feature based on: data associated with the meeting or meeting recording; data associated with a particular user, such as a user interacting (for example, inputting text such as a chat message, uttering a voice command, making a selection, or another user interaction) via a GUI during the meeting or after the meeting while viewing the meeting recording; or a combination thereof. In one embodiment, content feature determiner 260 is provided with data about a particular user and/or data about the meeting or meeting recording, both of which are received from or determined from the user data determined by user activity monitor 250, meeting-data collection component 210, or from one or more user profiles 240. In one example, user-meeting data 244 associated with a particular user and/or meeting is utilized to determine that user's context or indicate that user's intent, as described previously, such that a content feature is determined by content feature determiner 260 using this user-meeting data and based on the user's context or intent.

Some embodiments of content feature determiner 260 utilize content feature determination logic 230 to determine a content feature to provide the meeting recording segment determiner 270 or the time-stretching engine 290. In one embodiment, content feature determination logic 230 comprises computer instructions including rules, conditions, associations, predictive models, classification models, or other criteria for, among other operations, determining a content feature (determined by the meeting recording segment determiner 270), indexing the segments, or contextualizing the segments for a user. Content feature determination logic 230 may take different forms, depending on the particular information items being determined, contextualized, or processed for relevance, and/or based on user-meeting data or data indicating a context. For example, content feature determination logic 230 comprises any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these to determine (or facilitate determining) the content feature according to embodiments described herein.

In some embodiments, the content feature determiner 260 indexes and stores (in storage 225) the content features to facilitate other components of the system 200 in retrieving the content features. In this manner, the meeting recording segment determiner 270 can determine the segment and/or the time-stretching engine 290 can determine the adaptive playback speed and time-stretch the segment to the adaptive playback speed. In one embodiment, the content feature is indexed and used to generate the segments of the meeting recording. For example, as illustrated in FIG. 3, a plurality of segments are generated, such that the segments correspond to different identified speakers. In the example depicted in FIG. 4, the playback timeline includes segments corresponding to different topics.

In some embodiments, the content feature determined by content feature determiner 260 (which is determined using content feature determination logic 230) is based on explicit or inferred information about the meeting, the meeting recording, and/or the user(s). For example, content feature determination logic 230 includes logic specifying instructions for detecting explicit information about the meeting or meeting recording, determining an event time of the explicit information, or similarly for inferring a content feature based on particular user-meeting data, such as particular data associated with the meeting or meeting recording. Without limitation, examples of explicit information about the meeting or meeting recording can comprise a general topic of the meeting, a list of speakers from the meeting, a list of topics discussed, languages at which the meeting was delivered, and so forth. Examples of inferred data associated with the content feature comprises a relevancy of the meeting to a role associated with the user (and shared with other users), or the frequency, rate, or count of views of the meeting recording.

Some embodiments of content feature determination logic 230 comprise a plurality of logic for classifying various types of content features to determine the type(s) or category (ies) of a content feature, and/or include corresponding logic for determining the relevance of each type/category of content features. By way of example and without limitation, categories of content features determined by content feature determiner 260 (which employs content feature determination logic 230, in some embodiments) can comprise: information indicative of a person being mentioned, such as a person being ranked higher than the user who is viewing or listening to the meeting recording (such as a company chief operating officer (CEO) being ranked higher than a company vice president (VP), who is watching the meeting recording); information that a particular speaker is speaking; information of a topic of interest or key words or phrases being identified, such as the words or phrases "important," "crucial," "emphasize," "please listen," or "dollars"; information of a question being asked, as identified by determining the use of "who," "what," "where," "when," or any other question-promoting words or phrases; and/or so forth; information regarding a lack of visual or audio content defined as a gap; and information regarding a rate of words per length of time. Additionally, in one example, the specific content features in these categories (or another category) are be programmatically generated, ranked, or determined for relevance to the user, a group of users, or an organization or enterprise, according to the content feature determination logic 230. For example, a content feature is automatically determined by detecting a mention of a particular person (for example, the CEO of the enterprise), the start of the session of a particular speaker, a keyword mention, a question being asked, and the like. One example illustratively depicting time-stretched segments determined based on content features determined by the content feature determiner 260 (which uses content feature determination logic 230) is provided in FIG. 3. However, it should be understood that the time-stretched segments of FIG. 3 may also be generated additionally or alternatively based on users features (determined by the user features determined 256).

In one example, the content feature determiner 260 employs content feature determination logic 230 to receive (from user activity monitor 250) an indication of detection of a user input indicative of rewinding the meeting recording to re-play a portion of the meeting recording to which the meeting recording was rewound. In this example, the content feature determiner 260 determines the last time the meeting recording was accessed to determine a recency of access (for example, how recently the user/viewer accessed the meeting recording or viewed/attended the meeting). In this example, the content feature determiner 260 determines that recency of the meeting recording being played is within a recency threshold of time, such as two minutes, thirty minutes, one hour, six hours, one day, and so forth, or any value there between. Based on the recency of access being within the recency threshold of time, in this example, the content feature determiner 260 determines that a topic of the portion of the meeting corresponds to the at least one playback data feature, such that the segment is time-stretched based on the topic corresponding to the at least one playback data feature. In this manner, when a user rewinds the meeting recording that was recently accessed or watched, the rewound portion of the meeting recording that is rewatched is more likely to correspond to portion of the meeting that is relevant to the user since the meeting recording is fresh on the user's mind. Therefore, the rewinding in this example is less likely to be a product of a distracted user rewinding to watch a portion during which the user was previously distracted, and more likely to be a product of the user rewinding to a portion that the user identified as relevant.

Further, in some embodiments, the dedicated subcomponent utilizes content feature determination logic 230 that is specific for classifying the content feature to determine the particular category of the content feature. For instance, as shown in example system 200, content feature determiner 260 comprises mentions determiner 261, speaker determiner 262, topic/keyword determiner 263, question determiner 264, gap determiner 266, and word rate determiner 268. In one embodiment, the content feature determined by mentions determiner 261, speaker determiner 262, topic/keyword determiner 263, question determiner 264 corresponds to detection of an utterance, as described herein. On the other hand, in one embodiment, the content feature determined by gap determiner 266 corresponds to detection of gap, as described herein.

Mentions determiner 261, in general, is responsible for determining user-meeting data that comprises a person or entity being mentioned during the meeting. In one embodiment, the user-meeting data is used to determine a content feature indicating that a particular person or entity was mentioned during the meeting. For example, the mention of the person or entity can include, without limitation, instances during the meeting when a speaker uttered the name or identity of the person or entity, such as when the speaker uttered the name of the user or any person determined to be of interest to the users, such as the enterprise CEO. For example, mentions include a mention of a person or entity by someone other than the speaker via any suitable type of communication, such as live in-meeting chats, post-meeting question-and-answer sessions, or pre-meeting chat sessions. The user-meeting data is received, for example, from user activity monitor 250, meeting-data collection component 210, or from storage 225.

In some embodiments, a content feature including a mention of a person or entity is determined by mentions determiner 261 and ranked for relevance so that mentions that are more relevant are given priority and/or provided over mentions that are less relevant. For example, content feature determination logic 230 is used to determine relevance of a content feature to a particular user, a group of users, or an enterprise; determine a time (for example, start and/or end time) of the content feature; as well as score or rank the content features for relevance. In one example, relevance is determined based on any number of criteria such as, without limitation, freshness (or how recently the mentioned occurred); the number of times any name or entity was mentioned during the meeting (for example, as determined by processing a transcript of the meeting); or the importance of the person or entity that was mentioned relative to the user, a group of users, or the enterprise.

Speaker determiner 262, in general, is responsible for determining the identity of the speakers presenting content during the meeting. For example, a speaker might include a person who spoke for more than a threshold amount of time, such that those speakers who do not speak for a duration exceeding the threshold amount of time are not classified as speakers and instead are classified as people interrupting a meeting by asking questions or clarifying a point made by the speaker. Embodiments of speaker determiner 262 can process user-meeting data associated with the meeting or meeting recording to determine a speaker. In some embodiments, user-meeting data (such as communications data from a meeting or meeting recording (for instance, patterns of communication by the various speakers), location of the meeting, relationship data indicative of a relationship between the speaker and the user watching or listening to the meeting, which is determined from an organizational chart or contacts list, or other user-meeting data) is processed to determine a speaker. For example, playback data features are compared to determine a speaker, such as by performing a comparison of playback data features that comprise information regarding the speaking tempo and identity of speakers listed in an agenda providing information of the meeting. Specifically, a comparison operation can be performed to determine those different speaking patterns, which can indicate an instance of different speakers in a meeting. The user-meeting data, that is utilized by speaker determiner 262, is received, for example, from user activity monitor 250 (or a subcomponent, such as user features determiner 256), meeting-data collection component 210, or storage 225.

Embodiments of speaker determiner 262 utilize content feature determination logic 230 to determine a speaker's identify used as a content feature. According to one embodiment, speaker determiner 262 processes user-meeting data to determine a speaker of a meeting according to the following method. First, one or more speakers/people that were listed in a meeting description or that were identified during the meeting may be identified. In some embodiments, the speakers are ranked based on the duration of time a corresponding speaker spent speaking or the frequency with which the speaker spoke, or based on a role of the speaker relative to a user, a group of users, or an organization. Further, some embodiments consider communications or interactions having at least a threshold time duration, such as portions of the meeting exceeding two minutes having a common speaker.

Topic/keyword determiner 263, in general, is responsible for determining specialized information of the meeting, such as topics covered during a corresponding segment of the meeting or keywords provided during the meeting or meeting recording. Embodiments of topic/keyword determiner 263 determine explicit usage of keywords or inferred topics covered by a speaker and used to determine a segment (by the meeting recording segment determiner 270) and/or used to time-stretch the segment to a determined playback speed (based on the time-stretching engine). For instance, a user (or an administrator) creates a list of topics or specifies content keywords that are relevant. Alternatively or in addition, the keywords or topics are automatically generated by the topic/keyword determiner 263, for example, based on user-meeting data 244. Some embodiments use user-meeting data to determine content from which topic/keyword determiner 263 can infer topics and/or keywords that are used to determine a segment (by the meeting recording segment determiner 270) and/or used to time-stretch the segment to a determined playback speed (based on the time-stretching engine). Alternatively, once the segment is determined, according to an embodiment, topic/keyword determiner 263 performs a topic analysis operation (or topic detection, topic modeling, or topic extraction) to determine one or more topics from the segment. In some embodiments, the frequency or recency of topic(s) determined by the topic analysis is determined such that those topics occurring frequently or recently are determined to be content features.

In some embodiments, a computer application or service for identifying topics associated with particular people is used to determine topics associated with speakers. In one embodiment, from the topics determined to be associated with speakers, those topics occurring most often are determined as content features. One such example of a computer application or service for identifying topics associated with particular people is Microsoft Viva™ Topics. Some embodiments of topic/keyword determiner 263 can determine topics or keywords that are relevant based on content feature determination logic 230 and/or based on user-meeting data associated with a meeting or meeting recording, as described herein.

Question determiner 264, in general, is responsible for determining questions being asked during the meeting, either by the speaker or an attendee or other person from the audience. Examples of questions determined by question determiner 264 comprise, without limitation at least one of: a portion of a speaker's presentation in which the speaker's speaking tempo changed; certain words being identified, such as words like "question", "who," "what", "where", "when" and the like, as well as the phrases following these words; and the like. Embodiments of question determiner 264 determine an inquiry from a chat or other communication other than the speaker. For example, the question determiner 264 analyzes a chat or corresponding transcript to determine times in the meeting during which an audience or speaker asked a question.

In some embodiments, the question determiner 264 associates the question asked with when the question was answered. For example, when a meeting attendee asked a question in a chat at minute 25, and the speaker answered the question at minute 35 (for example, after reading the chat), the question determiner 264 associates the question (from minute 25) to the later associated answer (from minute 35). In one example, the question determiner 264 associates a question and an answer based on a comparison of the topic associated with the question and a topic associated with candidate answers. In one embodiment, the question determiner 264 employs any suitable rules (which include static or predefined rules defined by the content feature determination logic 230), Boolean logic, decision trees (for example, random forest, gradient boosted trees, or similar decision algorithms), conditions or other logic, a deterministic or probabilistic classifier, fuzzy logic, neural network, finite state machine, support vector machine, logistic regression, clustering, machine learning techniques, similar statistical processes, or combinations of these. In one example, the content feature determined by question determiner 264 is used to determine a segment (by the meeting recording segment determiner 270) and/or used to time-stretch the segment to a determined playback speed (based on the time-stretching engine 290). Alternatively, in one example, the question determiner 264 determines a question for a particular segment determined by the meeting recording segment determiner 270.

Gap determiner 266, in general, is responsible for determining portions of the meeting recording during which the video is silent or visual content is not presented. In the context of meeting recordings that includes solely audio, the gap corresponds to the non-tonal portions of the analyzed audio and can be caused by breath sounds, rests, or corresponds to trigger-filler words, such as "um", "you know," "uh," and "like" to name a few. For example, and without limitations, gaps include the portion of the meeting during which speakers transition, meeting breaks take place, technical audio difficulties occur, visual content ceases to be displayed, and so forth.

Embodiments of gap determiner 266 determine changes in sound parameters of audio of the meeting recording. Example sound parameters include the frequency, amplitude, wave form, wave duration, and so forth. In musical terms, the sound parameters include dynamics (loudness), sound pitch (or frequency), timbre (tone color), and so forth. In one example, the gap determiner 266 determines changes in sound parameters that exceeds or do not exceed a threshold value of change expressed as a fraction, ratio, percent, and so forth. Embodiments of the gap determiner 266 determine a start time at which the change in sound parameter was determined. In one embodiment, the gap determiner 266 determines whether the change in the sound parameter corresponds to an utterance or a gap. Thereafter, in one example, the gap determiner 266 determines another change in a sound parameter and determines the corresponding end time at which the other change in the sound parameter is determined. In one example, the duration of the gap or utterance corresponds to the time elapsed between the determined start time and end time corresponding to respective changes in sound parameters.

In one example, the determined gap is passed to the meeting recording segment determiner 270, such that the gap determined by the gap determiner 266 is automatically generated as a segment of the meeting recording segment determiner 270. In another example, the meeting recording segment determiner 270 receives the determined gap and further evaluates the gap for sound to verify and/or validate that the gap is indeed a gap (that does not include audio or sound). In one embodiment, the gap determined by the gap determiner 266 is communicated directly to the time-stretching engine 290 that determines the playback speed for the gap and time-stretches the gap based on the embodiments discussed herein.

Word rate determiner 268, in general, is responsible for determining a rate of occurrence of text parameters per length of time. In one embodiment, the determination is based on content feature determination logic 230. In one example, the text parameters include a count of words; punctuation marks, such as commas, periods, exclamation points, colons, and other grammar marks extracted by the word rate determiner 268 from a transcript of audio or a raw audio file; vowels; consonants; spaces; and so forth. In one example, the length of time includes any static or variable length of time defined by a start and end time. Example lengths of time include any number of seconds, minutes, or other unit of time measurements. In one example, the length of time corresponds to the length of time of the segment of the meeting recording determined by the meeting recording segment determiner 270, as discussed herein.

By way of a non-limiting example, the meeting recording segment determiner 270 determines a segment to be 2 minutes in duration, such that the segment is communicated to the word rate determiner 268 to determine the word rate. Continuing this example, thereafter, the word rate determiner 268 determines the words-per-minute of the segment by identifying the words (for example, separated by spaces in a corresponding transcript of the segment) and divides the identified words by 2 to determine the words-per-minute for the segment received from the meeting recording segment determiner 270. Continuing this example, thereafter, the word rate determiner 268 provides the determined words-per-minute to the time-stretching engine 290 to determine a playback speed for the segment based on the words-per-minute and/or based on other content features determined by the content feature determiner 260. As described herein, some embodiments of content feature determiner 260 employs content feature determination logic 230 to determine the content features determined by subcomponents 261, 262, 263, 264, 266, and 268.

Continuing with example system 200 of FIG. 2, meeting recording segment determiner 270 is generally responsible for determining continuous portions of the meeting recording that share common characteristics, based on the playback data features, to classify those continuous partitions as segments. In particular, embodiments of meeting recording segment determiner 270 determine at least one segment having a duration defined between a start and end time. In one example, the meeting recording segment determiner 270 determines the segment based on the user features (determined by the user features determiner 256) and/or the content features (determined by the content feature determiner 260). In some embodiments, data associated with the content features is received from content feature determiner 260 (or its subcomponents) or from playback data feature data 280; and/or data associated with the user features is received from the user activity monitor 250 (for example, the user features determiner 256), from the user profile 240, or from playback data feature data 280.

In one embodiment, the meeting recording segment determiner 270 determines the segment as part of a post-processing process of storing the meeting. After the meeting ends, the meeting is stored, for example, in storage 225. The segment determiner 270 may access the meeting to begin post-processing. Alternatively, in some embodiments, the post-processing process is initiated or performed by any other component of FIG. 2, such as but not limited to the meeting-data collection component 210, the user activity monitor 250, the content feature determiner 260, and so forth.

In some embodiments, user-meeting data associated with a particular user, which indicates that user's context and/or intent when interacting with a meeting or meeting recording, is used by meeting recording segment determiner 270 to determine the segment for the user. Thus, meeting recording segment determiner 270 also may receive user-meeting data for a user and/or meeting from user activity monitor 250 (or its subcomponents), meeting-data collection component 210, or a user profile 240. Further, in some embodiments of meeting recording segment determiner 270, the at least one time-stretched segment or the playback speed are determined based on the user-meeting data associated with the user, such as described herein.

In some embodiments, the meeting recording segment determiner 270 determines a segment based on the content feature determiner 260 (or its subcomponents). For example, the meeting recording segment determiner 270 receives an indication of a mention from the mentions determiner 261, such that the segment corresponds to the portion (defined between a start and end time) of the meeting recording sharing characteristics with the mention determined from the mentions determiner 261. In some embodiments, whether characteristics are shared is based on an analysis of the portions of the meeting recording surrounding the identified mention, and/or is based any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these. For example, a segment includes the portion of the meeting recording covering the mentioned topic or person, and related content.

As another example, the meeting recording segment determiner 270 receives an indication of a speaker from the speaker determiner 262, such that the segment corresponds to the portion of the meeting during which the determined speaker speaks or delivers content. The segment during which the speaker speaks or delivers may have a duration defined between a start time (during which the speaker begins speaking) and an end time (at which the speaker stops speaking or speaks a transition word, such as "thank you," "I now pass the presentation to," and so forth). In some embodiments, the meeting recording segment determiner 270 determines the segment based on a portion of audio sharing sound parameters with the voice of the speaker determined by the speaker determiner 262. In some embodiments, whether the sound parameters are shared with a voice of the speaker is based on an analysis of the portions of the meeting recording surrounding the identified mention, and/or is based on any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these. For example, a segment includes the portion of the meeting recording covering the mentioned topic or person, and related content.

As another example, the meeting recording segment determiner 270 receives an indication of a keyword or topic from the topic/keyword determiner 263, such that the segment corresponds to the portion (defined between a start and end time) of the meeting recording sharing characteristics with the keyword or topic determined by the topic/keyword determiner 263. In some embodiments, whether characteristics are shared is based on an analysis of the portions of the meeting recording surrounding the identified keyword or the portions covering the determined topic. In some embodiments, whether characteristics are shared is based on any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these. In one embodiment, a segment includes the portion of the meeting recording covering a topic (for example, engineering updates within the enterprise; or portions covering legal updates within the enterprise). In this manner, the segments determined for one user (for example, the engineer) may differ from the segments determined for another user (for example, the lawyer) based on the topics that are of interest to a user based on the respective user-meeting data.

As another example, the meeting recording segment determiner 270 receives an indication of a question from the question determiner 264, such that the segment corresponds to the portion (defined between a start and end time) of the meeting recording during which the question (determined from the question determiner 264) was asked. In some embodiments, the segment includes the question, the corresponding answer, and/or following discussion associated with the question. In some embodiments, whether to include the question, the answer, or following discussion associated with the question is based on an analysis of the portions of the meeting recording surrounding the identified question, and/or is based on any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these. For example, a segment includes the portion of the meeting recording covering the questions, the answer, and/or related content.

As another example, the meeting recording segment determiner 270 receives an indication of a gap from the gap determiner 266, such that the segment corresponds to the portion (defined between a start and end time) of the meeting recording during which the gap is determined by the gap determiner 266. In one embodiment, the gap is automatically determined to be a segment. Alternatively or additionally, the gap may be determined to be a segment if the gap exceeds a threshold duration value so that small pauses in the audio are not determined to be gaps. In one embodiment, whether the meeting recording segment determiner 270 determines the gap to be a segment is based on an analysis of the gap, and/or is based any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these.

As another example, the meeting recording segment determiner 270 receives an indication of a word rate from the word rate determiner 268, such that the segment corresponds to the portion (defined between a start and end time) of the meeting recording sharing characteristics with the word rate determined from the word rate determiner 268. In some embodiments, whether characteristics are shared is based on an analysis of the portions of the meeting recording surrounding the identified mention, and is based on any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these. For example, a segment includes the portion of the meeting recording sharing a word-per-minute (or other rate) with the determined word rate.

Continuing with FIG. 2, the time-stretching engine 290, in general, determines a playback speed for a segment determined by the meeting recording segment determiner 270. In one embodiment, aspects of the time-stretching engine are performed as part of the above-referenced post-processing process. In one example, the time-stretching engine 290 time-stretches the segment to the playback speed while maintaining or reducing the change in pitch. In particular, the pitch of the segments making up the meeting recording may be substantially similar or deviate no more than a threshold value of pitch measurement. In this manner, the playback speeds of the segments differ more than the pitches of the segments, for example, to avoid certain segments sounding low pitched (like a bass drum) and other segments sounding high pitched (like chipmunks). Accordingly, the effects of the changes in playback speed may be less distracting to listeners and enhance the user experience in viewing or listening to updated meeting recordings.

Some embodiments of time-stretching engine 290 utilize time-stretching logic 235 to determine an adaptive playback speed for a corresponding segment determined by the meeting recording segment determiner 270. In one embodiment, time-stretching logic 235 comprises computer instructions including rules, conditions, associations, predictive models, classification models, or other criteria for, among other operations, determining an adaptive playback speed for a time-stretched segment and/or scoring or ranking the segments of the meeting recording (determined by the meeting recording segment determiner 270) for an adaptive playback speed. In one embodiment, time-stretching logic 235 takes different forms, depending on the particular segments being determined, contextualized, or processed to determine the corresponding adaptive playback speed, and/or based on user-meeting data or data indicating a context. For example, time-stretching logic 235 comprises any suitable rules, such as Boolean logic, various decision trees (for example, random forest, gradient boosted trees, or similar decision algorithms), conditions or other logic, fuzzy logic, neural network, finite state machine, support vector machine, machine-learning techniques, or combinations of these to determine (or facilitate determining) the content feature according to embodiments described herein.

In one embodiment, the time-stretching engine 290 employs the time-stretching logic 235 to determine the adaptive playback speed. In one example, the time-stretching engine 290 determines the adaptive playback speed by determining that a word count, per period of time, of a prior segment of the meeting recording differs from a word count, per period of time, of a particular segment. Continuing this example, thereafter, the time-stretching engine 290 determines a ratio between the word count of the prior segment and the word count of the particular segment. Continuing this example, thereafter, the time-stretching engine 290 ratio is applied to the particular segment so that the word count, per period of time, of the prior segment substantially equals the word count, per period of time, of the particular segment. In one example, "substantially equals" refers to the word counts (per period of time) for different segments differing less than a threshold amount, expressed as a percentage, words, and so forth, such as word counts differing less than 5, 10, 15, 20%, and so forth.

In some embodiments, the time-stretching engine 290 employs time-stretching logic 235 to determine a weight or a category for a particular segment. In one example, weights or a respective category of the segments are used to determine a playback speed for a corresponding segment. For instance, according to some embodiments, a weight or category corresponds to a corresponding playback speed, such that determining the weight or category of the segment results in the playback speed of the segment being determined. In one embodiment, a weight is determined and used for inferring relevance of a segment to the user. For example, a high weight indicates higher relevance; a low weight indicates lower relevant; or conversely, a high weight indicates lower relevancy; or a low weight indicates higher relevancy. Similarly, a segment may be classified as a particular category or segment, which may indicate relevance to the user. In some embodiments, a weight or a category of a segment is determined based on a classification of a content feature associated in the segment, which may be determined as described previously using content feature determination logic 230.

In some embodiments of time-stretching engine 290 or time-stretching logic 235 use user-meeting data associated with a particular user to determine the relevance of the segment to the user, which is represented as the weight or a category associated with the segment. Thereafter, in one embodiment, the playback speed of the segment is determined based on the weight or category, and the segment is time-stretched to the determined playback speed. For example, each category may correspond to a different playback speed, which may be automatically determined or determined based on user settings specified in user configurations/settings 246. In one implementation where the playback speeds are automatically determined, two or more categories comprise indications of relevance to a user, such as relevant and less-relevant. A faster playback speed is automatically determined for the less-relevant category, and a slower playback speed is automatically determined for the relevant category.

A weight or category for the segment is determined, for example and without limitation: based on content features (determined by content feature determiner 260); based on user features (determined by user features determiner 256); based on user history, such as whether the user has previously been presented (or engaged) with a similar segment; and/or based on settings or preferences, which can be configured by the user or an administrator, such as user configurations/settings 246 in a user profile 240.

In one example, the weight or category relates to the playback speed via any suitable data structure stored in storage 225, such as a linear data structure that includes a list or an array; a tree data structure that includes binary, heap, and/or space partitioning; a table; or a hash data structure that includes a distributed hash table, a hash tree; or any suitable linear or non-linear data structure. For example, the time-stretching engine 290 maps the determined weight or category to the corresponding playback speed and assigns the corresponding playback speed to the segment. In one embodiment, the time-stretching engine 290 compares a determined weight of a segment to a default weight of a segment played back at a default playback speed, such that the deviation in the weight of the segment from the default weight of the segment corresponds to a deviation in the adaptive playback speed of the segment relative to the default playback speed.

In some embodiments, the time-stretching engine 290 uses the corresponding weight of the segment to rank, prioritize, or filter segments, such that only certain segments (having high or low weights) are time-stretched. Some embodiments of the time-stretching engine 290 are configured to filter segments so only certain segments, such as those having a certain weight, or those that have not recently been watched, or those having certain playback data features are time-stretched. For example, segments that do not have high or low weights, such as those that do not have the top 10% of the highest weight value or the lowest 10% of the lowest weight value, are played back at the default playback speed and are not time-stretched. Although the previous example included only time-stretching those segments having the highest or lowest percentage of weight values, it should be understood that any portion of the total segments may be time-stretched, such as only a threshold number of segments, the highest (or lowest) weighted segment, or a segment having a pre-set playback data feature. Indeed, any suitable portion (or subset) of all the segments may be time-stretched to avoid computationally time-stretching all segments.

In some embodiments, the time-stretching engine 290 classifies the segment determined by meeting recording segment determiner 270 based on the context of the user. For instance, as described previously, the user-meeting data associated with the user, which indicates the user's context, can include information indicating a particular computing application or device being used by the user to access a meeting or meeting recording. Thus, in one example, the information about the particular computing application is used by meeting recording segment determiner 270 or the time-stretching engine 290 to determine a classification for the segment. Alternatively, the meeting recording segment determiner 270 or the time-stretching engine 290 may classify the segment based on the content features or user features associated with the segment. For example, if the segment includes the gap determined by the gap determiner 266, the segment is classified as a gap that is less relevant to the user. Accordingly, in this example, the segment classified as a gap is time-stretched to a faster playback speed than the default playback speed of the segment.

As another example, if the segment includes a particular topic (determined by the topic/keyword determiner 263), the segment is classified based on the topic and the topic's relationship to the user, a group of user's, or the organization. Continuing this example, suppose a first segment is determined to concern the topic of legal updates and a second segment is determined to concern a topic of engineering updates. For example, for a user that is a lawyer, the first segment is classified as a segment covering a legal update and is played back at an adaptive playback speed that is slower than or at the default playback speed, while the second segment is classified as a segment covering an engineering topic and is played back at an adaptive playback speed that is faster than the default playback speed. As another example, for a user that is an engineer, the first segment is similarly classified as a segment covering a legal update, but is played back at an adaptive playback speed that is faster than the default playback speed, while the second segment is classified as a segment covering an engineering topic and is played back at an adaptive playback speed that is slower than or equal to the default playback speed. In this manner, the adaptive playback speed of the same segment or different segments may vary across users based on the user-meeting data, the user features, and/or the content features associated with the user.

In one embodiment, the time-stretching engine 290 applies the corresponding adaptive playback speed to the corresponding segment of the meeting recording. For example, suppose that the meeting recording segment determiner 270 determines that a segment exists between the 2 minute time marker and the 3 minute time marker. Further, suppose the time-stretching engine 290 determines (based on the playback data feature data 280) that the playback speed should be 1.5 times faster than the default playback speed. In this example, the time-stretching engine 290 modifies (for example, compresses) the segment so that it is played faster, namely, 1.5 times faster. For example, the time-stretching engine 290 adds the time-stretched segment into the meeting recording by replacing the original segment with the time-stretched segment. Alternatively, in one embodiment, the time-stretching engine 290 changes the playback speed of the original segment to correspond to the determined adaptive playback speed (in this example, 1.5 times faster than the default playback speed) to generate an updated meeting recording that includes the segment played back at the adaptive playback speed. In one embodiment, the time-stretching engine 290 saves the updated meeting recording in storage 225 and associate the updated meeting recording to a user from which meeting-user data was used to generated the updated meeting recording.

Example system 200 of FIG. 2 also includes storage 225. Storage 225 generally stores information including data, computer instructions (for example, software program instructions, routines, or services), logic, profiles, and/or models used in embodiments described herein. In an embodiment, storage 225 comprises a data store (or computer data memory). Further, although depicted as a single data store component, storage 225 can be embodied as one or more data stores or in the cloud.

As shown in example system 200 of FIG. 2, storage 225 includes content feature determination logic 230 and time-stretching logic 235, as previously described. Storage 225 also includes an example embodiment of a user profile 240 and playback data feature data 280. Example user profile 240 includes information about user accounts and devices 242, user-meeting data 244, and user configurations/settings 246. In some embodiments, the information stored in user profile 240 is available to other components of example system 200.

User accounts and devices 242 generally includes information about user devices accessed, used, or otherwise associated with a user, and/or information related to user accounts associated with the user, for example, which are used for accessing or collecting user data for a user (such as a user interacting with a meeting recording). For example, information of user accounts and devices 242 comprises at least one of: online or cloud-based accounts (for example, email, social media) such as a Microsoft® MSA account or a Microsoft 365 account; other accounts, such as entertainment or gaming-related accounts (for example, Xbox®, Netflix®, online game subscription accounts, or similar account information); communication data that relates to such accounts, such as user emails, texts, instant messages, calls, other communications, and other content; social network accounts and data, such as news feeds; online activity; and calendars, appointments, application data, other user accounts, or the like. Some embodiments of user accounts and devices 242 store information across one or more databases, knowledge graphs, or data structures. As described previously, the information stored in user accounts and devices 242 may be determined from meeting-data collection component 210 or user activity monitor 250 (including one or more of its subcomponents).

As described previously, user-meeting data 244 generally includes information about a user associated with the user profile 240. In one embodiment, user-meeting data 244 includes user data received from meeting-data collection component 210 or user data determined by user activity monitor 250 (or its subcomponents), which includes user-related activity data, a context or contextual information, and user data features (or structured or semi-structured user data), in some embodiments. In one embodiment, user-meeting data 244 includes information regarding a transcript of spoken content delivered during the meeting, or a chat transcript of messages exchanged privately or publicly during the meeting. User-meeting data 244 includes information regarding the user's interactions with one or more meetings or meeting recordings, such as the number of interactions, frequency, or other data regarding the interactions the user had during the meeting or past meeting recordings that are relevant to the user, in some embodiments.

User configurations/settings 246 generally include user settings or preferences associated with embodiments described herein. By way of example and not limitation, such settings include user configurations or preferences about the various thresholds described herein, confidence values associated with inferences, explicitly defined settings regarding user data used to determine a segment to time-stretch to an adaptive playback speed, preferences regarding adaptive playback speeds applied to time-stretched segments provided to the user, preferences or configurations regarding the presentation of the playback timeline region (and the playback timeline) by computing applications and services used by the user, or other preferences or configuration settings for any of the embodiments described herein.

Example playback data feature data 280, in general, comprises data associated with the content feature determined by the content feature determiner 260, data associated with the user feature determined by the user feature determiner 256, and any suitable data helpful in generating the interfaces of FIGS. 3 and 4. In one embodiment, the presentation component 220 receives the playback data feature data 280 to generate the interfaces of FIGS. 3 and 4. For example, the playback data feature data 280 includes data associated with the segments determined by the meeting recording segment determiner 270, the adaptive playback speed of the time-stretched segments determined by the time-stretching engine 290, and so forth.

Example system 200 includes a presentation component 220 that is generally responsible for presenting content including aspects of the time-stretched segments and the playback data feature data 280. In one example, the content is presented via one or more presentation components 816, as described in FIG. 8. In one embodiment, presentation component 220 comprises one or more applications or services on a user device across multiple user devices or in the cloud. For example, presentation component 220 manages the presentation of the time-stretched segments and playback speed across multiple user devices associated with that user, which the user accesses via a mobile device, laptop, or VR headset, and so forth. For example, presentation component 220 determines which user device(s) content is presented and/or how much content is presented, presents the events of interest generated by the content feature determiner 260, presents the enriched meeting playback timeline generated by the meeting recording segment determiner 270, presents the playback data feature data 280, and/or presents any data associated with any other components of system 200. Presentation component 220 presents playback data feature data 280, including any substitutions, reorganizations, or highlights as directed by presentation logic, content feature determiner 260, meeting recording segment determiner 270, time-stretching engine 290, and playback data feature data 280. In some embodiments, presentation component 220 presents the time-stretched segments, proactively and dynamically, such as that when a user interacts with (for example, selects) a GUI feature, the presentation component 220 causes a stream region to present the portion of the meeting based on the user interaction. For example, presentation component 220 determines when, whether, and how to present the meeting recording based on a context, and/or based on content feature determiner 260, meeting recording segment determiner 270, time-stretching engine 290, and/or playback data feature data 280.

Some embodiments of presentation component 220 assemble or format the time-stretched segments on the playback timeline region for consumption by a computing application or service. For example, as described previously, meeting recording segment determiner 270 determines a set segments for a particular computing application (for example, mobile application, VR application, or desktop application). Furthermore, some embodiments of the time-stretching engine 290 specify the adaptive playback speed and formatting of the segments, or to facilitate the formatting or presentation of the meeting recording to a user via a computing application or service. For example, the presentation component 220 presents one or more relevant time-stretched segments to a user via a meeting application, and additionally presents the meeting recording which has been updated based on the adaptive playback speed for a time-stretched segment. Similarly, in one example, presentation component 220 specifies presentation content to present in a stream region based on user selection on the playback timeline region. For example, in response to receiving a selection within the playback timeline region, the presentation component 220 causes the stream region to change the meeting recording to the time during the meeting recording corresponding to the selection portion on the playback timeline region. In this manner, a user is able to quickly toggle to a portion of the meeting recording (that includes a time-stretched segment), which then causes the presentation component 220 to cause presentation of the corresponding portion of the meeting recording to more quickly deliver desirable information to the user, enhancing the user experience and reducing resources associated with a user having to watch the entire meeting recording.

In one embodiment, presentation component 220 generates user interface elements associated with or used to facilitate the playback timeline region and stream region (such as shown in connection with FIGS. 3 and 4). Such elements can include icons or indicators, graphics buttons, sliders, menus, audio prompts, alerts, alarms, vibrations, pop-up windows, notification-bar or status-bar items, in-app notifications, queries, prompts, or other similar features for interfacing with a user.

With reference now to FIGS. 3 and 4, a number of example schematic screenshots from a personal computing device are illustratively depicted, showing aspects of example graphical user interfaces (GUIs) that include presentation of time-stretched segments having portions of the meeting recording that are played back at an adaptive playback speed different from a default playback speed, as described herein. The example time-stretched segments shown in FIGS. 3 and 4 are determined for a particular user and contextualized for that user, such as described in connection with the components of system 200 of FIG. 2. As such, in another example, another user is provided different segments, different time-stretched segments, different adaptive playback speeds associated with the time-stretched segments, or any combination thereof. The example segments are determined and generated by the meeting recording segment determiner 270 of FIG. 2 based on content features determined by content feature determiner 260 and/or user features determined by user features determiner 256; and the playback speed for the time-stretched segments is determined and applied by the time-stretching engine based on the time-stretching engine 290 of FIG. 2 and presentation component 220 of FIG. 2. Moreover, although the segments of FIG. 3 include segments corresponding to different speakers and the segments of FIG. 4 include segments corresponding to different topics, it should be understood that the segments can be generated based on any of the playback data features discussed herein and include segments of different types (for example, one segment corresponding to a speaker and another segment corresponding to a topic).

Turning to FIG. 3, an example schematic screen display 300 is shown, which represents a computing device, such as user device 102*n*, discussed above with respect to FIG. 1. Screen display 300 is shown having a graphical user interface (GUI) 302, which could be produced on the computing device screen display 300 by any of a number of different computer programs, applications or other displays discussed herein. In some embodiments, the GUI 302 includes a stream region 304 and a playback timeline region 305. The stream region 304 displays the meeting recording or a live meeting. The stream region 304 is capable of playing back a video stream that has been formatted as a MPEG-4 Part 14 (MP4) file, a MOV file, a QuickTime File Format (QTFF) file, a WMV file, an AVI file, an Advanced Video Coding High Definition (AVCHD) file, a WebM file, MKV file, or any other suitable video formatted file.

To facilitate tracking progression through the video, in one embodiment, the stream region 304 includes a playback timeline 306 that includes a play indicator 308 that is selectable to pause and continue playing the meeting recording presented on the stream region 304. In one embodiment, the playback timeline 306 has a length that corresponds to a duration of the meeting recording. For example, the leftmost side corresponds to a start of the meeting recording and the rightmost side corresponds to an end of the meeting recording. In one example, selection of a point between the leftmost end and the rightmost end of the playback timeline 306 causes the meeting recording to toggle or navigate to the corresponding portion of the meeting recording.

To better help a user to navigate to a particular portion of the meeting recording and to facilitate tracking progression through the video, the playback timeline 306 in the playback timeline region 305 includes a progress indication 310. In one embodiment, the progress indication 310 translates along the timeline 306 as the meeting recording is played in the stream region 304. In one example, the progress indication translates along the playback timeline 306 at a speed that is proportional to the playback speed of the corresponding segment. For example, the progress indication 310 translates on the playback timeline 306 at a faster speed for a time-stretched segment playable at an adapted playback speed that is faster than a segment playable at a default playback speed. In some embodiments, the progress indication 310 is draggable along the playback timeline 306 or the playback timeline 306 is selectable to toggle the meeting recording to a portion of the meeting stream consistent with the position of the progress indication 310 along the playback timeline 306.

In the illustrated embodiment, playback timeline region 305 includes a plurality of segments 320 that collectively are joined to correspond to the playback timeline 306. In one example, each segment of the plurality of segments 320 is associated with a duration that is proportional to the length of the segment 320 on the playback timeline 306. For example, a segment 320 of the meeting recording having a longer length has a longer duration than another segment of a shorter length on the playback timeline 306. In one embodiment, the leftmost side of the segment 320 also corresponds to a start of the segment, and the rightmost side of the segment 320 corresponds to an end of the meeting recording. In this manner, the position of the segment 320 along the playback timeline 306 may correspond to the portion of the meeting recording during which the segment is played.

As illustrated, the plurality of segments include (1) default segments 320*a* playable at the default playback speed and (2) time-stretched segments 320*b* playable at the corresponding playback speed. In one example, the default segments 320*a* are visually different from the time-stretched segments 320*b*. In this example, the default segments 320*a* are thinner, while the time-stretched segments 320*b* are thicker; however, it should be understood that the default segments 320*a* can differ from the time-stretched segments 320*b* with respect to any visual feature other than line thickness. As discussed above, in one embodiment, the time-stretched segments are playable at playback speeds that differ from one another. For example, one time-stretched segment has an adaptive playback speed that is faster than the default playback speed, while another time-stretched segment has an adaptive playback speed that is slower than the default playback speed.

As illustrated, the playback timeline region 305 includes visually distinct segments corresponding to each speaker in the meeting recording, such that each visually distinct segment corresponds to when each identified speaker delivers content during the meeting recording. In one example, the segments 320 are visually distinct for each speaker. As illustrated, the GUI 302 includes a legend 330 that visually correlates the distinct visual indication to a corresponding speaker. In one embodiment, the legend 330 further defines a corresponding playback speed for each speaker. For example, Anna is shown as an icon having a particular pattern and playback speed ("1.0×"), which matches the pattern and playback speed, respectively, of the corresponding segment. In this manner, a user may quickly reference the legend 330 to determine which visually distinct indication corresponds to a respective speaker.

In one example, the legend 330 is positioned within the playback timeline region. As illustrated, the portion of the meeting during which Anna was speaking is indicated as being the solid line and has a playback speed of 1.0 times the default playback speed. In this example, the portion of the meeting during which Anna was speaking is not time-stretched and is a default segment 320*a*, as determined by the meeting recording segment determiner 270 of FIG. 2 and the time-stretching engine 290 of FIG. 2. Moreover, in this example, the legend indicates that the speed of Anna's content is 1.0× the default playback speed and Anna's content corresponds to the solid line on the playback timeline 306. In this example, Anna's segment 320 is a default segment that is not time-stretched because the corresponding weight of the segment, as discussed above, indicates a playback speed that matches the default playback speed.

Turning to another speaker, the illustrated legend 330 indicates that the adaptive playback speed for the speaker Mike is three times the default playback speed (3.0×) and the time-stretched segment that corresponds to Mike has a visual dotted pattern. In this example, while the default segment 320*a* of Anna is presented as a solid line, the time-stretched segment 320*b* of Mike is presented as a thicker line to indicate that Anna's content is played back at the default playback speed, while Mike's content is presented at an adaptive playback speed. As illustrated, the segment 320 corresponding to Mike is longer than the segment corresponding to Anna because Mike spoke longer than Anna, as indicated by the longer segment associated with Mike.

In one embodiment, a user engages with the GUI to alter playback of the meeting recording. As a first example, the playback timeline region 305 includes a control icon 332 selectable to enable or disable the time-stretching of certain segments. In one embodiment, the control icon 332 is selectable to disable the functionality of the system 200, such that selecting the control icon 332 disables the time-stretching of segments to play the entire meeting recording at the default playback speed when the control icon 332 is in the disabled configuration. Thereafter, in this example, the control icon 332 is selectable to enable the functionality of the system 200, such that selecting the control icon 332 then enables the time-stretched segments to be played at the corresponding adaptive playback speed when the control icon 332 is in the enabled configuration. In one embodiment, the control icon 332 visually differs when in the enabled configuration as compared to the disabled configuration.

As a second example, the segments 320 or the elements in the legend 330 are selected to adjust the corresponding playback speed. In one embodiment, a user hovers over a segment and selects the segment (for example, via a right click) to open a pop-up window where the user can adjust the playback speed of the corresponding segment. In one embodiment, the pop-up window includes any suitable GUI feature associated with a playback speed option that is engageable to adjust the adaptive playback speed to any desired value. In one example, the selected playback speed option corresponds to the adaptive playback speed to be applied to the corresponding segment. Example GUI features include a drop down menu, a selectable box or shape, or a text field that receives alphanumeric characters, and the like. In another example, the pop-up window includes a selectable feature to revert the playback speed of a corresponding segment to the default playback speed (from the adaptive playback speed).

Similarly, in one embodiment, a user hovers over an icon of the person, selects the icon (for example, via a right click) to open a pop-up window where the user can adjust a playback speed of the segment(s) corresponding to the speaker indicated in the icon. In one embodiment, the pop-up window includes any suitable GUI feature associated with a playback speed option that is engageable to adjust the adaptive playback speed to any desired value. Example GUI features include a drop down menu, a selectable box or shape, or a text field that receives alphanumeric characters, and the like. In one embodiment, the user's selections are received by the meeting-data collection component 210 of FIG. 2, stored in storage 225 of FIG. 2, and communicated to the other components of FIG. 2 to train, verify, or validate the models discussed herein. In this manner, future determinations of the adaptive playback speed can be improved on based on the user changes.

In one embodiment, the GUI 302 includes a transcript region 340. The transcript region 340 displays a transcript associated with content playing back on the stream region. In particular, the transcript region 340 may include alphanumeric characters correlating to the audio presented in the stream region 304. Alternatively or additionally, the transcript region 340 includes text corresponding to a chat that was active during the meeting. For example, the transcript region 340 generates a live transcript of the audio associated with the meeting recording playing in the stream region 304. In one embodiment, the transcript region 340 presents audio that has been indexed based on a speaker (as determined by the speaker determiner 262 of FIG. 2). In this manner and as illustrated in the transcript region 340, a block of text and associated timestamps is presented proximate to text identifying the speaker.

FIG. 4 illustratively depicts an example schematic screen display 402 from a personal computing device showing aspects of an example GUI 302, in accordance with an embodiment of the present disclosure. Whereas the example screenshot of FIG. 3 includes a playback timeline 306 that has been partitioned into segments 320 that correspond to different speakers on a common timeline, the example screen display 402 of FIG. 4 includes a playback timeline 306 that has been partitioned into segments 320 that correspond to different topics. For example, the playback timeline 306 is partitioned into the following segments 320: "Meeting Introduction and Remarks", "Engineering Updates," "Personalized Action Items", "How Data Lives", "Legal Updates", "Interest Points for MSAI", "Picture of Future Research Areas," and "Question and Answer." Each of the segments, in this example, is a time-stretched segment 320*b* that has been time-stretched to a corresponding adaptive playback speed. In one embodiment, the time-stretching engine 290 of FIG. 2 determines the playback speed based on the playback data feature data 280, such as the content features and user features discussed herein.

In one example, the illustrated time-stretched segment 320*b* corresponding to the "Meeting Introduction and Remarks" is generated based on a content feature determined or generated by the topic/keyword determiner 263 of FIG. 2, and this segment 320 has an adaptive playback speed that is three times (3.0×) as fast as the default playback speed of the meeting recording. For example, the user features may indicate that this particular user always speeds up the introduction, such that this segment should also be sped up. On the other hand, in this example, the time-stretched segment 320*b* corresponding to the "Meeting Introduction and Remarks" is generated based on a content feature determined or generated by the topic/keyword determiner 263 and/or word rate determiner 268, and has an adaptive playback speed that is half as fast as the default playback speed of the meeting recording. This may be due to the time-stretching engine 290 determining (1) that the word count per minute of the content is twice as fast as the average word count of a default playback speed and (2) that the legal updates covers topics of high interest (as indicated by the weights and slower playback speed) to the user. Although in this illustrated example, every segment is time-stretched, it should be understood that in certain embodiments, certain segments are not time-stretched and instead left unaltered and played back at the default playback speed.

In one embodiment, the GUI includes an indication providing a description of why a time-stretched segment has been time-stretched to the adaptive playback speed. For example, the indication providing the description may be presented proximate to the corresponding icon on the legend 330. In one example, the indication providing the description is presented in response to a user interaction (hovering or selection input) on the corresponding segment 320 or visual indication on the legend 330. In one embodiment, the indication providing the description is based on the user profile 240, the user activity monitor 250, the content feature determiner 260, the meeting recording segment determiner 270, the time-stretching engine 290, and/or the playback data feature data 280. Although the embodiments disclosed herein may be employed in association with the GUI features discussed with respect to FIGS. 3 and 4, it should be understood that any additional or alternative GUI features may be employed.

Figure 5:
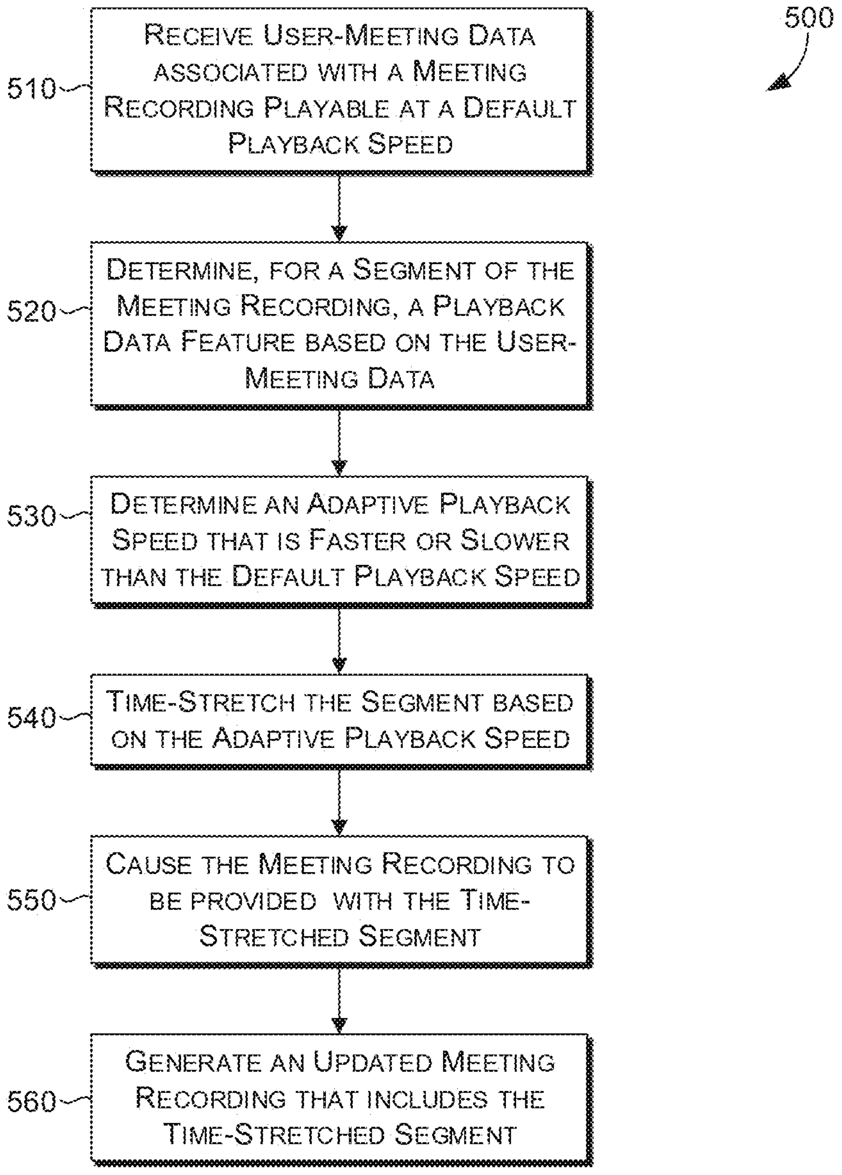
FIG. 5 depicts a flow diagram of a method for programmatically generating an updated meeting recording that includes a time-stretched segment, in accordance with an embodiment of the present disclosure.
Figure 6:
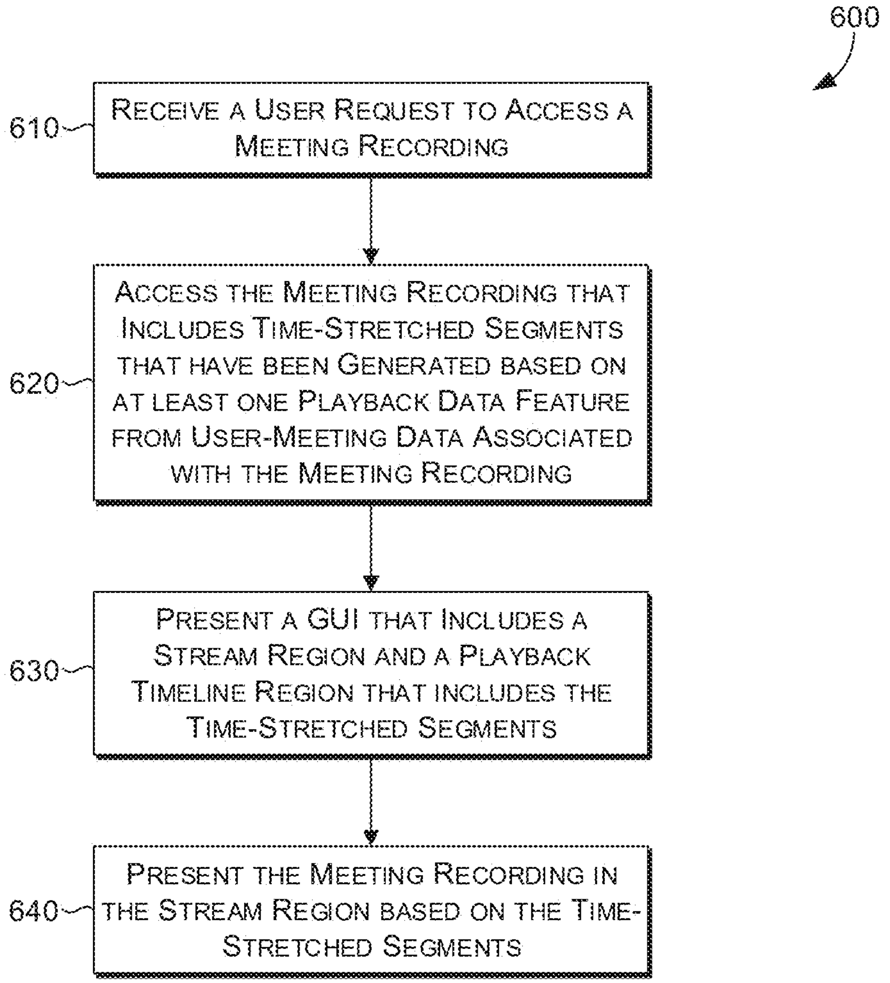
FIG. 6 depicts a flow diagram of a method for programmatically presenting a meeting recording based on at least one time-stretched segment, in accordance with an embodiment of the present disclosure.
Figure 7:
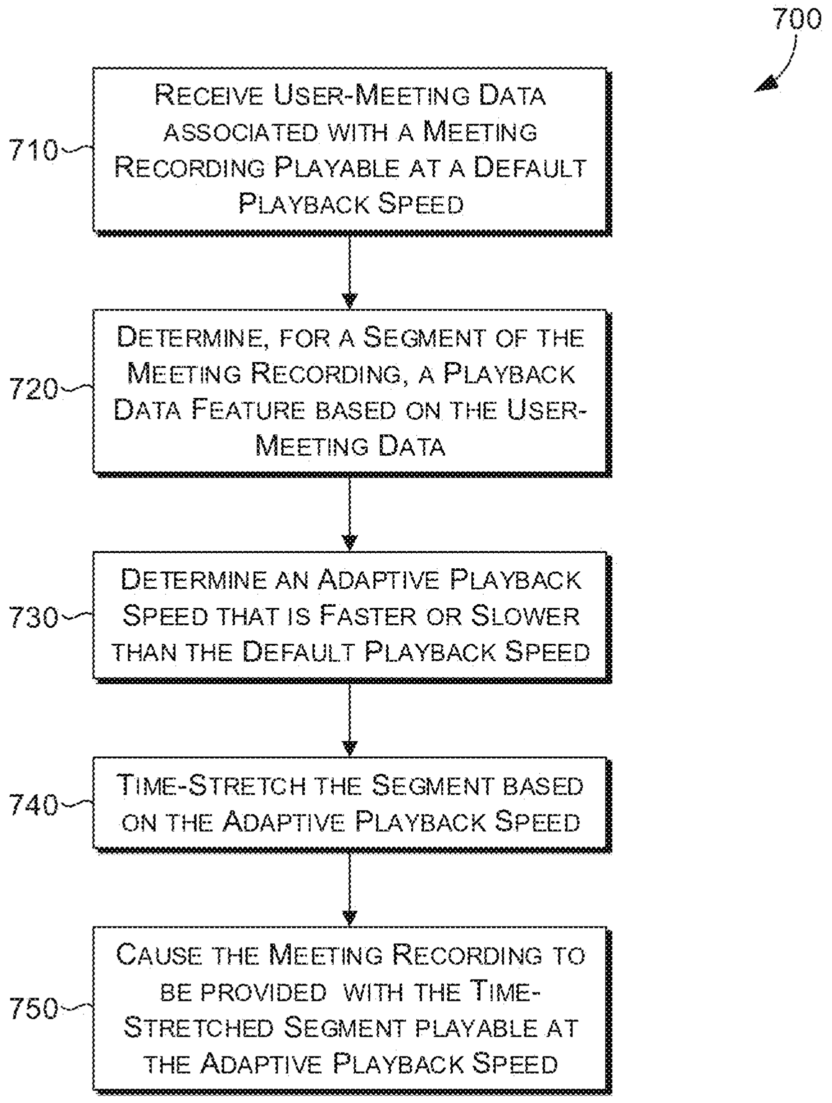
FIG. 7 depicts a flow diagram of a method for programmatically providing a meeting recording with a time-stretched segment playable at an adaptive playback speed, in accordance with an embodiment of the present disclosure.

Turning now to FIGS. 5, 6, and 7, aspects of example process flows 500, 600, and 700 are illustratively depicted for some embodiments of the disclosure. Process flows 500, 600, and 700 each comprise a method (sometimes referred to herein as method 500, 600, and 700) that may be carried out to implement various example embodiments described herein. For instance, at least one of process flows 500, 600, or 700 are performed to programmatically determine events of interest or generate enriched meeting playback timeline(s)

for a user by processing user-meeting data, which are used to provide any of the improved electronic communications technology or enhanced user computing experiences described herein.

Each block or step of process flow 500, process flow 600, process flow 700, and other methods described herein comprises a computing process that may be performed using any combination of hardware, firmware, and/or software. For instance, various functions are carried out by a processor executing instructions stored in memory, such as memory 812 as described in FIG. 8 and/or as storage 225 as described in FIG. 2. The methods may also be embodied as computer-usable instructions stored on computer storage media. The methods may be provided by a stand-alone application, a service or hosted service (stand-alone or in combination with another hosted service), or a plug-in to another product, to name a few. For example, the blocks of process flow 500, 600, and 700 that correspond to actions (or steps) to be performed (as opposed to information to be processed or acted on) are carried out by one or more computer applications or services, in some embodiments, which operate on one or more user devices (such as user device 102*a* of FIG. 1), servers (such as server 106 of FIG. 1), and/or are distributed across multiple user devices, and/or servers, or by a distributed computing platform, and/or are implemented in the cloud, such as described in connection with FIG. 9. In some embodiments, the functions performed by the blocks or steps of process flows 500, 600, and 700 are carried out by components of system 200, as described in FIG. 2.

With reference to FIG. 5, aspects of example process flow 500 are illustratively provided for generating an updated meeting recording that includes the time-stretched segment 320*b* of FIG. 3, and, in some embodiments, causing the meeting recording to be provided with the time-stretched segment 320*b* of FIG. 3. In one example, example process flow 500 is performed to generate the GUI 302 illustrated in FIG. 3 and as described in connection with FIG. 2.

At a block 510, method 500 includes receiving user-meeting data associated with a meeting recording playable at a default playback speed. Embodiments of block 510 perform operations including receiving user-meeting data, as discussed in FIG. 2, with respect to the meeting-data collection component 210 and the user activity monitor 250. In particular, user-meeting data may include any data associated with the user and a meeting attended by the user.

At block 520, method 500 includes determining, for a segment of the meeting recording, a playback data feature based on the user-meeting data. In some embodiments, the content feature determiner 260 and/or the user features determiner 256 of FIG. 2 determines (block 520) the playback data feature as discussed with respect to FIG. 2. In one example, the playback data feature is stored in storage 225 of FIG. 2 and the playback data feature data 280 of FIG. 2.

At block 530, method 500 includes determining an adaptive playback speed that is faster or slower than the default playback speed. In one example, embodiments of block 530 include determining the adaptive playback speed by determining that a word count, per period of time, of a prior segment of the meeting recording differs from a word count, per period of time, of the segment; and determining a ratio between the word count of the prior segment and the word count of the segment, wherein the ratio is applied to the segment so that the word count, per period of time, of the prior segment substantially equals the word count, per period of time, during the segment.

At block 540, method 500 includes time-stretching the segment based on the adaptive playback speed to generate a time-stretched segment. In some embodiments, the time-stretching engine 290 of FIG. 2 time-stretches the segment (block 540) to the adaptive playback speed. In one example, time-stretching the segment includes adjusting a playback speed of the segment of the meeting recording from the default playback speed to the adaptive playback speed while maintaining a pitch of the segment of the meeting recording.

At block 550, method 500 includes causing the meeting recording to be provided with the time-stretched segment. In some embodiments, the time-stretching engine 290 of FIG. 2 causes (block 550) the meeting recording to be provided with the time-stretched segment. In one embodiment, the presentation component 220 of FIG. 2 causes (block 550) the meeting recording to be provided with the time-stretched segment.

At block 560, method 500 includes generating an updated meeting recording that includes the time-stretched segment. In some embodiments, the time-stretching engine 290 of FIG. 2 generates (block 560) an updated meeting recording that includes the time-stretching segment. In one embodiment, the presentation component 220 of FIG. 2 generates (block 560) an updated meeting recording that includes the time-stretching segment.

With reference to FIG. 6, aspects of example process flow 600 are illustratively provided for presenting a meeting recording in a stream region based on time-stretched segments. Example process flow 600 is performed to present a meeting recording in a stream region based on time-stretched segments, as described in FIGS. 2, 3, and 4. In one example, presentation of the meeting recording is based on the content feature determiner 260, the meeting recording segment determiner 270, the playback data feature data 280, and/or the time-stretching engine 290, such as described in FIG. 2.

At a block 610, method 600 includes receiving a user request to access a meeting recording. At block 620, method 600 includes accessing the meeting recording. In one embodiment, the meeting recording is stored in storage 225 of FIG. 2 and accessed by the presentation component 220 of FIG. 2. In one example, the meeting recording includes a plurality of time-stretched segments presentable at a corresponding adaptive playback speed that have been generated based on at least one playback data feature from user-meeting data associated with the meeting recording, as discussed herein. In one example, the meeting recording is accessed (block 620) in response to receiving the user request.

At block 630, method 600 includes subsequent to receiving the request, presenting a graphical user interface (GUI) that includes a stream region and a playback timeline region separate from the stream region. The playback timeline region includes an indication corresponding to each time-stretched segment of the plurality of time-stretched segments of the meeting recording. In one embodiment, the stream region and the playback timeline region are presented (block 630) to generate a GUI similar to that depicted in FIGS. 3 and 4. The GUI may be generated by the presentation component 220 of FIG. 2, as discussed herein.

At block 640, method 600 includes presenting, on the computing device, the meeting recording in the stream region based on the plurality of time-stretched segments and the adaptive playback speed. In one embodiment, the meeting recording is presented (block 640) on a stream region 304 similar to that depicted in FIGS. 3 and 4. The GUI may be generated by the presentation component 220 of FIG. 2, as discussed herein.

Turning to FIG. 7, aspects of example process flow 700 are illustratively provided for causing the meeting recording to be provided with the time-stretched segment. Example process flow 700 may be performed to provide an updated meeting recording, as described in connection with FIG. 2. In one embodiment, the meeting recording is provided with the time-stretched segment based on the content feature determiner 260, the meeting recording segment determiner 270, the playback data feature data 280, and/or the time-stretching engine 290, such as described in FIG. 2.

At a block 710, method 700 includes receiving user-meeting data associated with a meeting recording playable at a default playback speed. Embodiments of block 710 perform operations including receiving user-meeting data, as discussed in FIG. 2, with respect to the meeting-data collection component 210 and the user activity monitor 250. In particular, user-meeting data may include any data associated with the user and a meeting attended by the user.

At block 720, method 700 includes determining, for a segment of the meeting recording, a playback data feature based on the user-meeting data. In some embodiments, the content feature determiner 260 and/or the user features determiner 256 determines (block 720) the playback data feature as discussed in FIG. 2. In one example, the playback data feature is stored in storage 225 and the playback data feature data 280 of FIG. 2.

At block 730, method 700 includes determining an adaptive playback speed that is faster or slower than the default playback speed. In one example, embodiments of block 730 include determining the adaptive playback speed by determining that a word count, per period of time, of a prior segment of the meeting recording differs from a word count, per period of time, of the segment; and determining a ratio between the word count of the prior segment and the word count of the segment, wherein the ratio is applied to the segment so that the word count, per period of time, of the prior segment substantially equals the word count, per period of time, during the segment.

At block 740, method 700 includes time-stretching the segment based on the adaptive playback speed to generate a time-stretched segment. In some embodiments, the time-stretching engine 290 of FIG. 2 time-stretches the segment (block 740) to the adaptive playback speed. In one example, time-stretching the segment includes adjusting a playback speed of the segment of the meeting recording from the default playback speed to the adaptive playback speed while maintaining a pitch of the segment of the meeting recording.

At block 750, method 700 includes causing the meeting recording to be provided with the time-stretched segment. In some embodiments, the time-stretching engine 290 of FIG. 2 causes (block 750) the meeting recording to be provided with the time-stretching segment. In one embodiment, the presentation component 220 of FIG. 2 causes (block 750) the meeting recording to be provided with the time-stretching segment.

Accordingly, we have described various aspects of technology directed to systems and methods for intelligently processing and presenting, on a computing device, group data that is contextualized for a user. It is understood that various features, sub-combinations, and modifications of the embodiments described herein are of utility and may be employed in other embodiments without reference to other features or sub-combinations. Moreover, the order and sequences of steps shown in the example methods 500, 600, and 700 are not meant to limit the scope of the present disclosure in any way, and in fact, the steps may occur in a variety of different sequences within embodiments hereof. Such variations and combinations thereof are also contemplated to be within the scope of embodiments of this disclosure.

OTHER EMBODIMENTS

In some embodiments, a computer system is provided, such as the computerized (or computer or computing) system described in any of the embodiments above. The computer system comprises at least one processor, and computer memory having computer-readable instructions embodied thereon, that, when executed by the at least one processor, perform operations. The operations comprise receiving user-meeting data associated with a meeting recording playable at a default playback speed. The operations further comprise programmatically determining, for a segment of the meeting recording, at least one playback data feature based on the user-meeting data. The operations further comprise automatically classifying the segment of the meeting recording into a category based at least on the at least one playback data feature. The operations further comprise, based at least in part on the category, automatically determining, for the segment of the meeting recording, an adaptive playback speed that is faster or slower than the default playback speed. The operations further comprise time-stretching the segment of the meeting recording into a time-stretched segment based on the adaptive playback speed. The operations further comprise causing at least a portion of the meeting recording to be provided with the time-stretched segment and generating an updated meeting recording comprising the time-stretched segment.

In any combination of the above embodiments of the system, determining the adaptive playback speed comprises (1) determining that a word count, per period of time, of a prior segment of the meeting recording differs from a word count, per period of time, of the segment, and (2) determining a ratio between the word count of the prior segment and the word count of the segment, wherein the ratio is applied to the segment so that the word count, per period of time, of the segment and the prior segment are substantially equal.

In any combination of the above embodiments of the system, each weight defines an adaptive playback speed to which a corresponding segment of the plurality of segments is time-stretched. The updated meeting recording is playable at a plurality of playback speeds corresponding to the plurality of segments. At least two of the plurality of playback speeds are different from each other.

In any combination of the above embodiments of the system, the adaptive playback speed is determined based on visual content associated with the meeting recording, wherein the segment of the meeting recording is time-stretched to coordinate audio of the meeting recording with the visual content.

In any combination of the above embodiments of the system, the operations further comprise determining the segment of the meeting recording by performing additional operations. The additional operations include determining a contiguous portion of the meeting recording having a common playback data feature. The common data playback feature includes an indication of: a speaker, a topic, an audio content, a visual content, an application that is presented, or a meeting attendees screen that is presented. The additional operations include (1) determining a start time of the contiguous portion of the meeting recording that corresponds to a first change of the common data playback feature, (2) determining an end time of the contiguous portion of the meeting recording that corresponds to a second change of the common data playback feature, and (3) determining the segment of the meeting recording as the contiguous portion of the meeting recording from the start time to the end time.

In any combination of the above embodiments of the system, time-stretching the segment comprises adjusting a playback speed of the segment of the meeting recording from the default playback speed to the adaptive playback speed while maintaining a pitch of the segment of the meeting recording.

In any combination of the above embodiments of the system, determining the at least one playback data feature comprises: (1) detecting a user input indicative of accessing a previous portion of the meeting recording; (2) determining that recency of the meeting recording being played or the meeting recording being accessed is within a recency threshold of time; and (3) based on the recency being within the recency threshold of time, determining that a topic of the previous portion of the meeting corresponds to the at least one playback data feature. The segment is time-stretched based on the topic corresponding to the at least one playback data feature.

In any combination of the above embodiments of the system, the operations further comprise determining the segment of the meeting recording by (1) determining a change in sound parameters, of audio of the meeting recording, corresponding to a start time; (2) determining whether the change in the sound parameters corresponds to an utterance or a gap; (3) determining another change in the sound parameters, of the meeting recording, corresponding to an end time; (4) determining that the segment corresponds to the utterance or gap; and (5) classifying the segment based on whether the segment corresponds to the utterance or the gap. The segment is time-stretched based on the classification. The utterance or gap has a duration defined between the start time and end time.

In any combination of the above embodiments of the system, the at least one playback data feature comprises a user feature specific to a particular user and a content feature specific to content of the meeting recording.

In any combination of the above embodiments of the system, the operations further comprise classifying the user-activity data as the productivity activity comprising determining a first productivity score for the user-activity data associated with the first GUI element of the first computer application. The operations further comprise determining additional user-activity data associated with a second GUI element of a second computer application based on the monitored user activity; classifying the additional user-activity data as the productivity activity including determining a second productivity score for the additional user-activity data associate with the second GUI element. Based on a comparison of the first and second productivity scores, if the first productivity score is higher than the second productivity score, the operations further comprise causing the visually-deemphasized effect to be applied to the second GUI element of the second computer application. Based on a comparison of the first and second productivity scores, if the second productivity score is higher than the first productivity score, the operations comprise causing the visually-deemphasized effect to transition to the first GUI element, such that the transition comprises applying the visually-deemphasized effect to another portion of the display surface that excludes the second GUI element and includes the first GUI element. Alternatively or additionally, based on a comparison of the first and second productivity scores, if the first productivity score and the second productivity score are In any combination of the above embodiments of the system, the at least one playback data feature comprises at least one of a topic of the meeting recording, a type of meeting recording, an identity of a speaker in the meeting recording, a relationship of the speaker to a viewer, a duration of the meeting recording, a duration of pauses in the meeting recording, a transition from a first speaker to a second speaker different from the first speaker, a timing constraint associated with a calendar application, a rate of words per period of time, visual feedback indicative of a level of user engagement with the meeting recording from a wearable device, or contextual metadata expressed as data features indicative of meeting invitees, meeting attendees, or a type of meeting.

In some embodiments, a computerized method is provided. The method comprises receiving, from a computing device, a request to access a meeting recording. The method further comprises accessing the meeting recording comprising a plurality of time-stretched segments presentable at a corresponding adaptive playback speed and that have been generated based on at least one playback data feature from user-meeting data associated with the meeting recording. The adaptive playback speed is determined automatically based on visual content associated with the meeting recording, and the segment of the meeting recording is time-stretched to coordinate audio of the meeting recording with the visual content. The method further comprises subsequent to receiving the request, presenting a graphical user interface (GUI) comprising a stream region and a playback timeline region separate from the stream region. The playback timeline region includes an indication corresponding to each time-stretched segment of the plurality of time-stretched segments of the meeting recording. The method further comprises presenting, on the computing device, the meeting recording in the stream region based on the plurality of time-stretched segments and the adaptive playback speed.

In any combination of the above embodiments of the method, the method further comprises receiving a first input indicative of hovering over a segment of the meeting recording. The method further comprises in response to receiving the first input, causing presentation of a window comprising a plurality of playback speed options. The method further comprises receiving a second input indicative of selecting a playback speed option. The adaptive playback speed for the segment changes to correspond to the playback speed of the selected playback speed option.

In any combination of the above embodiments of the method, the plurality of time-stretched segments are visually distinct, on the playback timeline region, from a plurality of default segments that are not time-stretched.

In any combination of the above embodiments of the method, the method further comprises determining a weight for each time-stretched segment of a plurality of time-stretched segments of the meeting recording. Each weight defines a corresponding time-stretching for a corresponding time-stretched segment of the plurality of time-stretched segments. The updated meeting recording is playable based on the weight for each time-stretched segment.

In any combination of the above embodiments of the method, the method further comprising traversing a progress indication along the playback timeline region based on the meeting recording being played.

In any combination of the above embodiments of the method, at least two time-stretched segments of the plurality of time-stretched segments are playable at different playback speeds from each other In some embodiments, computer storage media is provided, such as any of the computer storage media described herein, that, when executed by at least one computer processor, causes computing operations to be performed. The operations comprise receiving user-meeting data associated with a meeting recording playable at a default playback speed. The operations further comprise dividing the meeting recording into a plurality of segments. The operations further comprise determining, for each segment of the plurality of segments, at least one playback data feature based on the user-meeting data. The operations further comprise based at least in part on the at least one playback data feature, determining, for each segment of the plurality of segments, a corresponding adaptive playback speed that is faster or slower than the default playback speed. The operations further comprise time-stretching each segment of the plurality of segments into a time-stretched segment based on the corresponding adaptive playback speed. The operations further comprise causing the meeting recording to be provided with the plurality of time-stretched segments. The meeting recording comprises each segment of the plurality of time-stretched segment is playable at the corresponding adaptive playback speed.

In any combination of the above embodiments of the computer storage media, the operations comprise determining at least one segment of the plurality of segments by (1) determining a change in sound parameters, of the meeting recording, corresponding to a start time; (2) determining whether the change in the sound parameters corresponds to an utterance or a gap; (3) determining another change in the sounds parameters, of the meeting recording, corresponding to an end time; (4) determining that the at least one segment corresponds to the utterance or gap; and (5) classifying the at least one segment based on whether the at least one segment corresponds to the utterance or the gap. The at least one segment is time-stretched based on the classification, and the utterance or gap has a duration defined between the start time and the end time.

In any combination of the above embodiments of the computer storage media, the operations further comprise storing the meeting recording; and subsequent to storing the meeting recording, post-processing the meeting recording. Each segment of the plurality of segments is time-stretched after during post-processing the meeting recording.

In any combination of the above embodiments of the computer storage media, the user-meeting data is specific to the user viewing the meeting recording, wherein each segment of the plurality of segments is time-stretched for the user and is not time-stretched for another users.

Example Computing Environments

Figure 8:
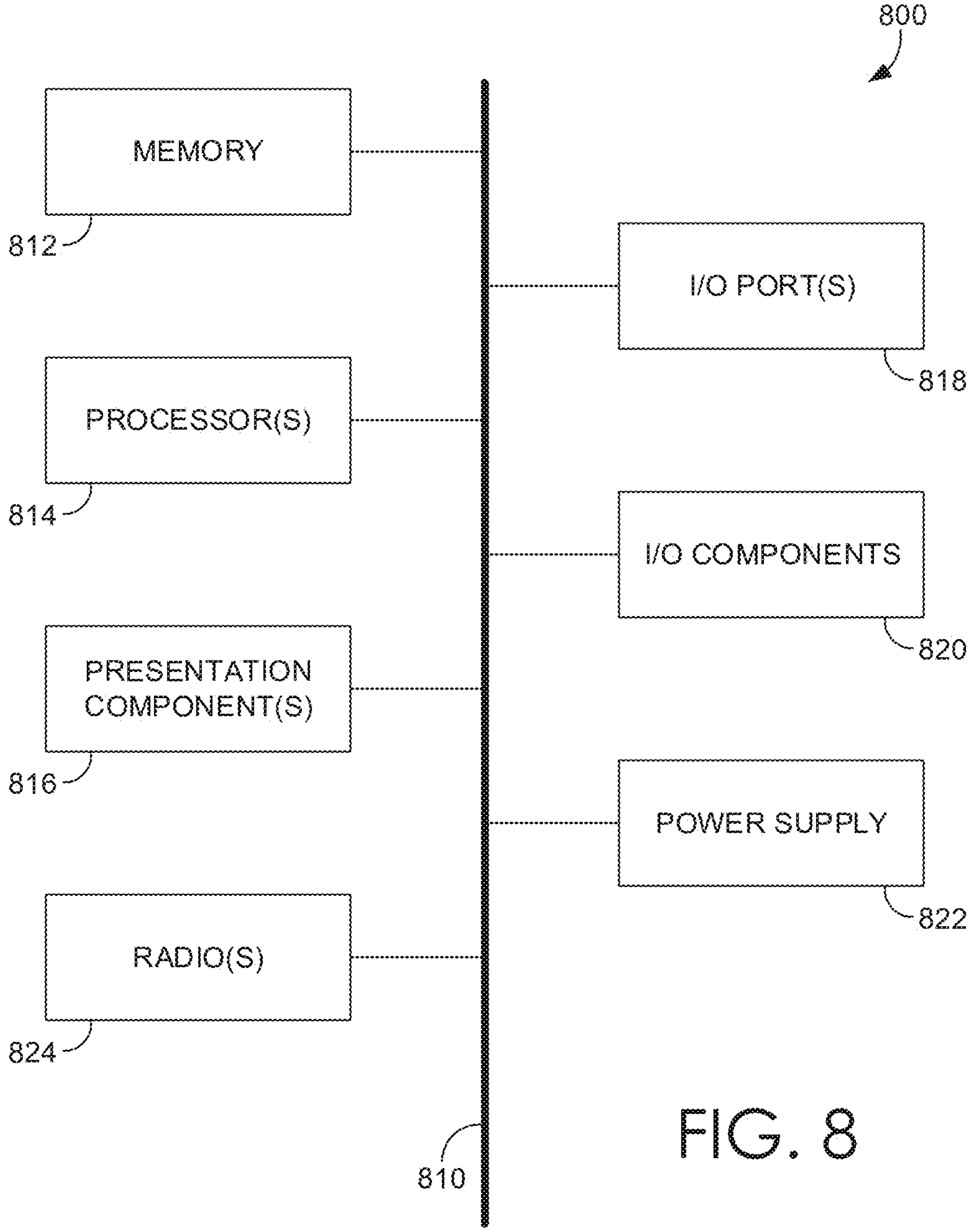
FIG. 8 is a block diagram of an example computing environment suitable for use in implementing an embodiment of the present disclosure.
Figure 9:
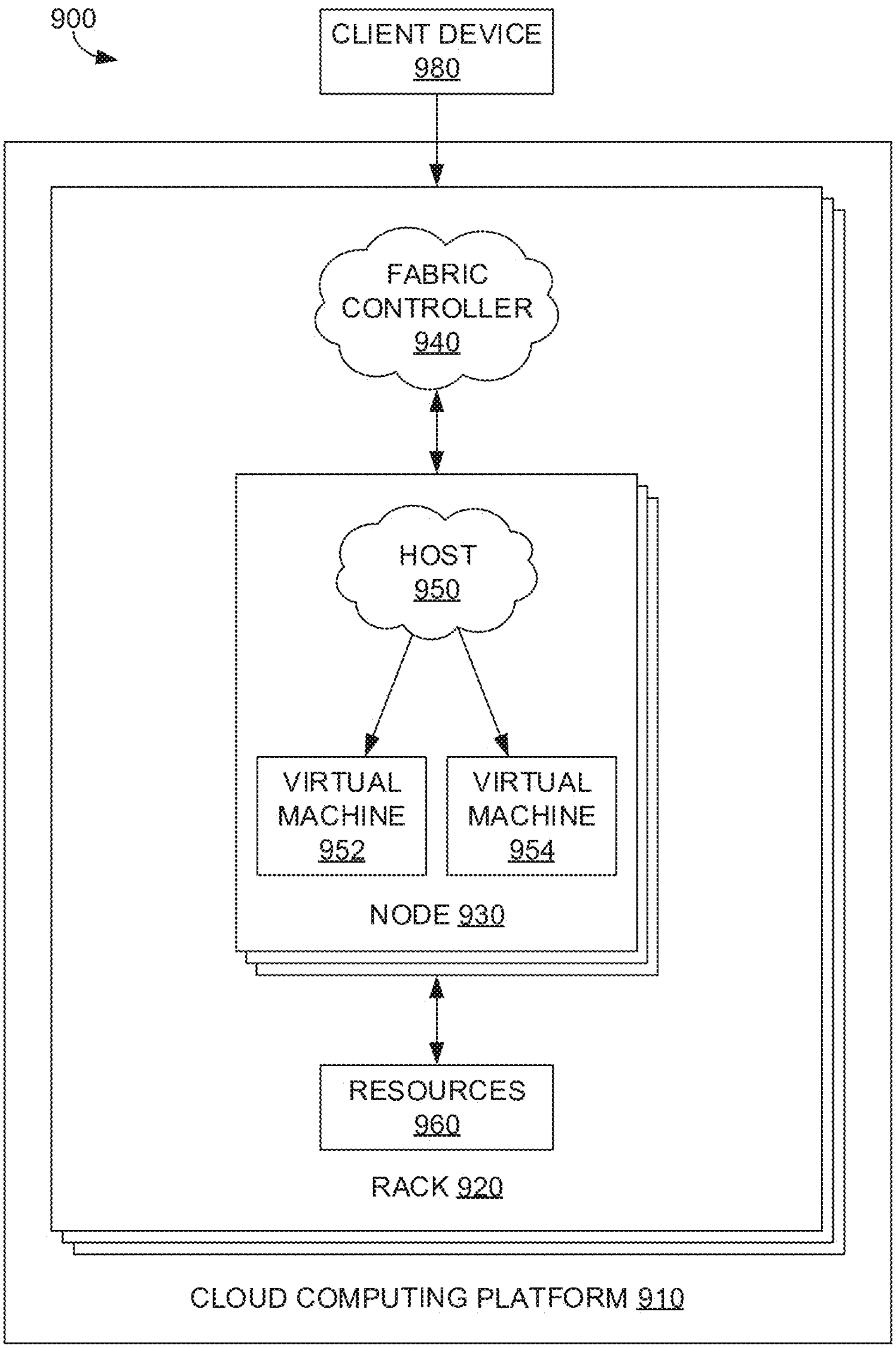
FIG. 9 is a block diagram of an example computing environment suitable for use in implementing an embodiment of the present disclosure.

Having described various implementations, several example computing environments suitable for implementing embodiments of the disclosure are now described, including an example computing device and an example distributed computing environment in FIGS. 8 and 9, respectively. With reference to FIG. 8, an example computing device is provided and referred to generally as computing device 800. The computing device 800 is but one example of a suitable computing environment and is not intended to suggest any limitation as to the scope of use or functionality of embodiments of the disclosure. Neither should the computing device 800 be interpreted as having any dependency or requirement relating to any one or combination of components illustrated.

Embodiments of the disclosure are described in the general context of computer code or machine-useable instructions, including computer-useable or computer-executable instructions, such as program modules, being executed by a computer or other machine such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Some embodiments comprise an end-to-end software-based system that operates within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating to, for example, logic, control, and memory operations. Low level software written in machine code can provide more complex functionality to higher level software. Accordingly, in some embodiments, computer-executable instructions includes any software, including low level software written in machine code, higher level software such as application software, and any combination thereof. In this regard, the system components can manage resources and provide services for system functionality. Any other variations and combinations thereof are contemplated with the embodiments of the present disclosure.

With reference to FIG. 8, computing device 800 includes a bus 810 that directly or indirectly couples the following devices: memory 812, one or more processors 814, one or more presentation components 816, one or more input/output (I/O) ports 818, one or more I/O components 820, and an illustrative power supply 822. Bus 810 represents what may be one or more buses (such as an address bus, data bus, or combination thereof). Although the various blocks of FIG. 8 are shown with lines for the sake of clarity, in reality, these blocks represent logical, not necessarily actual, components. For example, a presentation component includes a display device, such as an I/O component. Also, processors have memory. The inventors hereof recognize that such is the nature of the art and reiterate that the diagram of FIG. 8 is merely illustrative of an example computing device that can be used in connection with one or more embodiments of the present disclosure. Distinction is not made between such categories as "workstation," "server," "laptop," or "handheld device," as all are contemplated within the scope of FIG. 8 and with reference to "computing device."

Computing device 800 typically includes a variety of computer-readable media. Computer-readable media can be any available media that can be accessed by computing device 800 and includes both volatile and nonvolatile, removable and non-removable media. By way of example, and not limitation, computer-readable media comprises computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. The memory may be removable, non-removable, or a combination thereof. Hardware devices include, for example, solid-state memory, hard drives, and optical-disc drives. Computing device 800 includes one or more processors 814 that read data from various entities such as memory 812 or I/O components 820. As used herein, the term processor or "a processer" may refer to more than one computer processor. For example, the term processor (or "a processor") may refer to at least one processor, which may be a physical or virtual processor, such as a computer processor on a virtual machine. The term processor (or "a processor") also may refer to a plurality of processors, each of which may be physical or virtual, such as a multiprocessor system, distributed processing or distributed computing architecture, cloud computing system, or parallel processing by more than a single processor. Further, various operations described herein as being executed or performed by processor may be performed by more than one processor.

Presentation component(s) 816 presents data indications to a user or other device. Presentation components include, for example, a display device, speaker, printing component, vibrating component, and the like.

The I/O ports 818 allow computing device 800 to be logically coupled to other devices, including I/O components 820, some of which may be built in. Illustrative components include a microphone, joystick, game pad, satellite dish, scanner, printer, or a wireless device. The I/O components 820 may provide a natural user interface (NUI) that processes air gestures, voice, or other physiological inputs generated by a user. In some instances, inputs are transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

Some embodiments of computing device 800 include one or more radio(s) 824 (or similar wireless communication components). The radio transmits and receives radio or wireless communications. The computing device 800 may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. In one embodiment, the radio communication is a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (for example, a primary connection and a secondary connection). A short-range connection includes, by way of example and not limitation, a Wi-Fi® connection to a device (for example, mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Referring now to FIG. 9, an example distributed computing environment 900 is illustratively provided, in which implementations of the present disclosure may be employed. In particular, FIG. 9 shows a high level architecture of an example cloud computing platform 910 that can host a technical solution environment, or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 900 that include cloud computing platform 910, rack 920, and node 930 (for example, computing devices, processing units, or blades) in rack 920. The technical solution environment can be implemented with cloud computing platform 910, which runs cloud services across different data centers and geographic regions. Cloud computing platform 910 can implement fabric controller 940 component for provisioning and managing resource allocation, deployment, upgrade, and management of cloud services. Typically, cloud computing platform 910 acts to store data or run service applications in a distributed manner. Cloud computing platform 910 in a data center can be configured to host and support operation of endpoints of a particular service application. Cloud computing platform 910 may be a public cloud, a private cloud, or a dedicated cloud.

Node 930 can be provisioned with host 950 (for example, operating system or runtime environment) running a defined software stack on node 930. Node 930 can also be configured to perform specialized functionality (for example, compute nodes or storage nodes) within cloud computing platform 910. Node 930 is allocated to run one or more portions of a service application of a tenant. A tenant can refer to a customer utilizing resources of cloud computing platform 910. Service application components of cloud computing platform 910 that support a particular tenant can be referred to as a multi-tenant infrastructure or tenancy. The terms "service application," "application," or "service" are used interchangeably with regards to FIG. 9, and broadly refer to any software, or portions of software, that run on top of, or access storage and computing device locations within, a datacenter.

When more than one separate service application is being supported by nodes 930, nodes 930 may be partitioned into virtual machines (for example, virtual machine 952 and virtual machine 954). Physical machines can also concurrently run separate service applications. The virtual machines or physical machines can be configured as individualized computing environments that are supported by resources 960 (for example, hardware resources and software resources) in cloud computing platform 910. It is contemplated that resources can be configured for specific service applications. Further, each service application may be divided into functional portions such that each functional portion is able to run on a separate virtual machine. In cloud computing platform 910, multiple servers may be used to run service applications and perform data storage operations in a cluster. In one embodiment, the servers perform data operations independently but exposed as a single device, referred to as a cluster. Each server in the cluster can be implemented as a node.

Client device 980 may be linked to a service application in cloud computing platform 910. Client device 980 may be any type of computing device, such as user device **102*n* described with reference to FIG. 1, and the client device 980 can be configured to issue commands to cloud computing platform 910. In embodiments, client device 980 communicates with service applications through a virtual Internet Protocol (IP) and load balancer or other means that direct communication requests to designated endpoints in cloud computing platform 910. The components of cloud computing platform 910** may communicate with each other over a network (not shown), which includes, without limitation, one or more local area networks (LANs) and/or wide area networks (WANs).

Additional Structural and Functional Features of Embodiments of Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

As used herein, the term "set" may be employed to refer to an ordered (i.e., sequential) or an unordered (i.e., non-sequential) collection of objects (or elements), such as machines (for example, computer devices), physical and/or logical addresses, graph nodes, graph edges, functionalities, and the like. As used herein, a set may include N elements, where Nis any positive integer. That is, a set may include 1, 2, 3, . . . . N objects and/or elements, where N is a positive integer with no upper bound. Therefore, as used herein, a set does not include a null set (i.e., an empty set), that includes no elements (for example, N=0 for the null set). A set may include only a single element. In other embodiments, a set may include a number of elements that is significantly greater than one, two, three, or billions of elements. A set may be an infinite set or a finite set. The objects included in some sets may be discrete objects (for example, the set of natural numbers N). The objects included in other sets may be continuous objects (for example, the set of real numbers R). In some embodiments, "a set of objects" that is not a null set of the objects may be interchangeably referred to as either "one or more objects" or "at least one object," where the term "object" may stand for any object or element that may be included in a set. Accordingly, the phrases, "one or more objects" and "at least one object" may be employed interchangeably to refer to a set of objects that is not the not null or empty set of objects. A set of objects that includes at least two of the objects may be referred to as "a plurality of objects."

As used herein, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjoint sets if the intersection between the two sets is the null set.

As used herein, the terms "application" or "app" may be employed interchangeably to refer to any software-based program, package, or product that is executable via one or more (physical or virtual) computing machines or devices. An application may be any set of software products that, when executed, provide an end-user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

For purposes of a detailed discussion above, embodiments of the present invention are described with reference to a computing device or a distributed computing environment; however the computing device and distributed computing environment depicted herein are non-limiting examples. Moreover, the terms computer system and computing system may be used interchangeably herein, such that a computer system is not limited to a single computing device, nor does a computing system require a plurality of computing devices. Rather various aspects of the embodiments of this disclosure may be carried out on a single computing device or a plurality of computing devices, as described herein. Additionally, components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A computerized method, comprising:

accessing user-meeting data associated with a meeting recording playable at a default playback speed;

programmatically determining, for a respective segment of the meeting recording, at least one playback data feature based on the user-meeting data;

automatically classifying the respective segment of the meeting recording into a category based at least on the at least one playback data feature;

determining a ratio between a first word count of a prior segment and a second word count of the respective segment;

based at least in part on the category and the ratio, automatically determining, for the respective segment of the meeting recording, an adaptive playback speed that is faster or slower than the default playback speed;

time-stretching the respective segment of the meeting recording into a time-stretched segment based on the adaptive playback speed;

causing at least a portion of the meeting recording to be provided with the time-stretched segment; and generating a data file comprising an updated meeting recording comprising the time-stretched segment.

2. The computerized method of claim 1, wherein time-stretching the respective segment further comprises applying the ratio to the respective segment so that the first word count and the second word count are substantially equal per period of time.

3. The computerized method of claim 1, further comprising determining that the first word count, per period of time, differs from the second word count, per the period of time, wherein the adaptive playback speed is further determined based on the difference in the first word count and the second word count, per the period of time.

4. The computerized method of claim 1, wherein each weight defines a corresponding adaptive playback speed to which a corresponding segment of a plurality of segments is time-stretched, wherein the updated meeting recording is playable at a plurality of playback speeds corresponding to the plurality of segments, at least two of the plurality of playback speeds being different from each other.

5. The computerized method of claim 1, wherein the adaptive playback speed is further determined based on visual content associated with the meeting recording, wherein the respective segment of the meeting recording is time-stretched to coordinate audio of the meeting recording with the visual content.

6. The computerized method of claim 1, further comprising determining at least one of the respective segment or the prior segment of the meeting recording by:

determining a contiguous portion of the meeting recording having a common playback data feature, the common data playback feature comprising an indication of: a speaker, a topic, an audio content, a visual content, an application that is presented, or a meeting attendees screen that is presented;

determining a start time of the contiguous portion of the meeting recording that corresponds to a first change of the common data playback feature;

determining an end time of the contiguous portion of the meeting recording that corresponds to a second change of the common data playback feature; and determining at least one of the respective segment or the prior segment of the meeting recording as the contiguous portion of the meeting recording from the start time to the end time.

7. The computerized method of claim 1, wherein time-stretching the respective segment comprises adjusting a playback speed of the respective segment of the meeting recording from the default playback speed to the adaptive playback speed while maintaining a pitch of the respective segment of the meeting recording.

8. The computerized method of claim 1, wherein determining the at least one playback data feature comprises:

detecting a user input indicative of accessing a previous portion of the meeting recording;

determining that recency of the meeting recording being played or the meeting recording being accessed is within a recency threshold of time; and based on the recency being within the recency threshold of time, determining that a topic of the previous portion of a meeting corresponds to the at least one playback data feature, wherein the respective segment is time-stretched based on the topic corresponding to the at least one playback data feature.

9. The computerized method of claim 1, further comprising determining at least one of the respective segment or the prior segment of the meeting recording by:

determining a change in sound parameters, of audio of the meeting recording, corresponding to a start time;

determining whether the change in the sound parameters corresponds to an utterance or a gap;

determining another change in the sound parameters, of the meeting recording, corresponding to an end time, wherein the utterance or the gap has a duration defined between the start time and the end time;

determining that at least one of the respective segment or the prior segment corresponds to the utterance or the gap; and classifying at least one of the respective segment or the prior segment based on whether at least one of the respective segment or the prior segment corresponds to the utterance or the gap, wherein at least one of the respective segment or the prior segment is time-stretched based on the classification.

10. The computerized method of claim 1, wherein the at least one playback data feature comprises:

a user feature specific to a particular user; and a content feature specific to content of the meeting recording.

11. The computerized method of claim 1, wherein the at least one playback data feature comprises at least one of a topic of the meeting recording, a type of meeting recording, an identity of a speaker in the meeting recording, a relationship of the speaker to a viewer, a duration of the meeting recording, a duration of pauses in the meeting recording, a transition from a first speaker to a second speaker different from the first speaker, a timing constraint associated with a calendar application, a rate of words per period of time, visual feedback indicative of a level of user engagement with the meeting recording from a wearable device, or contextual metadata expressed as data features indicative of meeting invitees, meeting attendees, or a type of meeting.

12. Computer storage media having computer-executable instructions embodied thereon, that, when executed by at least one computer processor, cause computing operations to be performed, the operations comprising:

receiving, from a computing device, a request to access a meeting recording;

accessing the meeting recording comprising a plurality of time-stretched segments presentable at a corresponding adaptive playback speed and that have been generated based on at least one playback data feature from user-meeting data associated with the meeting recording, wherein the corresponding adaptive playback speed is determined based on visual content associated with the meeting recording and based on a ratio between a first word count of a prior segment and a second word count of a respective segment, wherein the respective segment is time-stretched to the corresponding adaptive playback speed;

subsequent to receiving the request, presenting a graphical user interface (GUI) comprising a stream region and a playback timeline region separate from the stream region, the playback timeline region comprising an indication corresponding to each time-stretched segment of the plurality of time-stretched segments of the meeting recording; and presenting, on the computing device, the meeting recording in the stream region based on the plurality of time-stretched segments and the corresponding adaptive playback speed.

13. The computer storage media of claim 12, wherein the corresponding adaptive playback speed is further determined based on a determination that the first word count differs from the second word count per period of time.

14. The computer storage media of claim 13, wherein the corresponding adaptive playback speed is applied to the respective segment so that the word count, per the period of time, of the time-stretched respective segment and the prior segment are substantially equal, and wherein the respective segment of the meeting recording is time-stretched to the adaptive playback speed to coordinate audio of the meeting recording with the visual content.

15. The computer storage media of claim 12, wherein the operations further comprise:

receiving a first input indicative of hovering over a segment of the meeting recording;

in response to receiving the first input, causing presentation of a window comprising a plurality of playback speed options; and receiving a second input indicative of selecting a playback speed option, wherein the corresponding adaptive playback speed for the respective segment changes to correspond to the playback speed of the selected playback speed option.

16. The computer storage media of claim 12, wherein the plurality of time-stretched segments are visually distinct, on the playback timeline region, from a plurality of default segments that are not time-stretched.

17. The computer storage media of claim 12, wherein the operations further comprise determining a weight for each time-stretched segment of a plurality of time-stretched segments of the meeting recording, wherein each weight defines a corresponding time-stretching for a corresponding time-stretched segment of the plurality of time-stretched segments, wherein the meeting recording is playable based on the weight for each time-stretched segment.

18. The computer storage media of claim 12, wherein the operations further comprise traversing a progress indication along the playback timeline region based on the meeting recording being played.

19. A computer system comprising:

at least one processor; and computer memory having computer-readable instructions embodied thereon, that, when executed by the at least one processor, cause the computer system to perform operations comprising:

receiving user-meeting data associated with a meeting recording playable at a default playback speed;

dividing the meeting recording into a plurality of segments;

determining, based on the user-meeting data and for at least one segment of the plurality of segments, at least one playback data feature by:

detecting a user input indicative of accessing a previous portion of the meeting recording;

determining that a recency of the meeting recording being played or the meeting recording being accessed is within a recency threshold of time; and based on the recency being within the recency threshold of time, determining that a topic of the previous portion of a meeting corresponds to the at least one playback data feature;

based at least in part on the at least one playback data feature, determining, for the at least one segment of the plurality of segments, a corresponding adaptive playback speed that is faster or slower than the default playback speed;

time-stretching the at least one segment of the plurality of segments into a time-stretched segment based on the corresponding adaptive playback speed; and causing the meeting recording to be provided with the time-stretched at least one segment playable at the corresponding adaptive playback speed.

20. The computer system of claim 19, wherein the operations further comprise determining a ratio between a first word count of a prior segment and a second word count of the at least one segment, wherein the ratio is applied to the at least one segment so that a word count, per period of time, of the time-stretched segment and the prior segment is substantially equal, wherein the corresponding adaptive playback speed is further determined based on the ratio.

* * * * *